US008175789B2

(12) United States Patent
Kojima et al.

(10) Patent No.: US 8,175,789 B2
(45) Date of Patent: May 8, 2012

(54) COMBUSTION CONTROLLER FOR COMPRESSION-IGNITION DIRECT-INJECTION ENGINE AND ENGINE CONTROL SYSTEM FOR THE SAME

(75) Inventors: Akikazu Kojima, Gamagori (JP); Hiroshi Haraguchi, Kariya (JP); Youhei Morimoto, Kariya (JP); Tokuji Kuronita, Kariya (JP); Satoru Sasaki, Kariya (JP)

(73) Assignee: Denso Corporation, Kariya (JP)

( * ) Notice: Subject to any disclaimer, the term of this patent is extended or adjusted under 35 U.S.C. 154(b) by 1071 days.

(21) Appl. No.: 12/061,078

(22) Filed: Apr. 2, 2008

(65) Prior Publication Data

US 2008/0243358 A1 Oct. 2, 2008

(30) Foreign Application Priority Data

Apr. 2, 2007 (JP) .................................. 2007-96862
Feb. 7, 2008 (JP) .................................. 2008-27571

(51) Int. Cl.
*F02D 41/30* (2006.01)
(52) U.S. Cl. ..................... 701/104; 701/102; 123/299
(58) Field of Classification Search .......... 701/101–105, 701/115; 123/297–305, 406.11, 406.23, 123/406.32, 478, 491
See application file for complete search history.

(56) References Cited

U.S. PATENT DOCUMENTS

| | | | | |
|---|---|---|---|---|
| 4,479,186 A | * | 10/1984 | Takao et al. .................... | 701/104 |
| 4,480,620 A | * | 11/1984 | Tange et al. .................... | 123/478 |
| 4,551,803 A | * | 11/1985 | Hosaka et al. ................. | 701/105 |
| 4,736,302 A | * | 4/1988 | Kinugawa et al. ............. | 701/103 |
| 5,069,182 A | * | 12/1991 | Kako ........................ | 123/406.47 |
| 6,510,834 B1 | * | 1/2003 | Tomita et al. .................. | 123/295 |
| 6,742,492 B2 | * | 6/2004 | Kimura .......................... | 123/295 |
| 6,742,494 B2 | * | 6/2004 | Unger et al. ................... | 123/305 |

(Continued)

FOREIGN PATENT DOCUMENTS

| | | |
|---|---|---|
| JP | 11-141386 | 5/1999 |
| JP | 11-148410 | 6/1999 |
| JP | 2004-100559 | 4/2004 |
| JP | 2004-150335 | 5/2004 |
| JP | 2006-183466 | 7/2006 |

OTHER PUBLICATIONS

Office Action (1 pg.) dated Aug. 9, 2011 issued in corresponding Japanese Application No. 2008-027571 with an at least partial English-language translation thereof (1 pg.).

*Primary Examiner* — John T. Kwon
*Assistant Examiner* — Johnny Hoang
(74) *Attorney, Agent, or Firm* — Nixon & Vanderhye P.C.

(57) ABSTRACT

As a compression-ignition direct-injection engine combustion controller, a program for detecting ignition timing of a main injection Mn (main ignition timing), a program for correcting a command value of main injection execution timing in a direction to the side where a detection value is converged within a predetermined range, a program for determining whether or not the corrected command value is within a predetermined range, and a program for, when it is determined that the command value is not within the range, correcting a command value related to an injection amount of a pilot injection Pt based on whether or not the command value is on a delay side or an advance side of the range.

17 Claims, 13 Drawing Sheets

U.S. PATENT DOCUMENTS

| | | |
|---|---|---|
| 6,999,869 B1 * | 2/2006 | Gitlin et al. .................... 701/115 |
| 7,400,966 B2 * | 7/2008 | Strom et al. ................... 701/104 |
| 7,509,938 B2 * | 3/2009 | Morimoto et al. ............ 123/299 |
| 7,848,869 B2 * | 12/2010 | Kakuya et al. ................ 701/103 |
| 2005/0022779 A1 * | 2/2005 | Hattori et al. ................. 123/305 |
| 2005/0274352 A1 | 12/2005 | Canale et al. |
| 2007/0044753 A1 * | 3/2007 | Brehob .......................... 123/304 |
| 2007/0276579 A1 * | 11/2007 | Asano ........................... 701/103 |

* cited by examiner

INJECTION COMMAND

HEAT GENERATION RATE

COMBUSTION CONTROLLER FOR COMPRESSION-IGNITION DIRECT-INJECTION ENGINE AND ENGINE CONTROL SYSTEM FOR THE SAME

CROSS-REFERENCE TO RELATED APPLICATION

This application is based on Japanese Patent Applications No. 2007-96862 filed on Apr. 2, 2007 and No. 2008-27571 filed on Feb. 7, 2008, the disclosures of which are incorporated herein by reference.

FIELD OF THE INVENTION

The present invention relates to a combustion controller for a compression-ignition direct-injection engine, applied to an engine system having a compression ignition engine and a fuel injection valve for direct injection, to control the operation of at least one actuator in the system. Further, the present invention relates to an engine control system including the compression-ignition direct-injection engine combustion controller.

BACKGROUND OF THE INVENTION

In an engine for a vehicle (particularly, internal combustion engine), fuel injected by a fuel injection valve (injector) is ignited and combusted within a combustion chamber in a predetermined cylinder, and torque (power) is generated on a predetermined output shaft (crankshaft). In a diesel engine for a vehicle, before or after a main injection, a sub injection is performed to inject fuel in an amount smaller than that of the main injection, which is called as a multi-step injection. To reduce noise upon fuel combustion and a NOx emission, a pilot injection or pre injection may be performed by a small injection amount before the main injection. Further, for the purpose of activation of diffusive combustion, and reduction of particulate matters (PM), an after injection (performed at injection timing during fuel combustion near the main injection) may be performed after the main injection. Otherwise, for the purpose of activation of a catalyst by the rise of exhaust temperature and/or supply of reduced component, a post injection (performed at injection timing after the completion of combustion much delayed from the main injection) may be performed. Upon engine control in recent years, fuel supply to an engine is performed using one or arbitrary combination of these various injections.

In a system using such multistep injection, because the sub injection is performed by a little amount of fuel, the injection is influenced by environmental condition. For example, in unstable combustion such as PCCI combustion or HCCI combustion, the combustion amount of fuel injected by a pilot injection (pilot combustion amount) is easily changed. The pilot combustion amount fluctuates by e.g. influence of disturbance (fuel property, intake temperature change and the like). When such fluctuation of pilot combustion amount occurs, the combustion characteristic of the fuel injected by a main injection (a main combustion amount, main combustion timing and the like) is also influenced. Accordingly, in multistep injection control, an error (shift) easily occurs in the combustion characteristic of the main combustion. When such error occurs in the combustion characteristic, emission deterioration and unstable combustion status are conceivable.

For example, an apparatus which calculates (detects) main ignition timing (combustion start timing), as ignition timing of main fuel injected by a main injection, by using a cylinder pressure sensor (CPS) to output a detection signal corresponding to pressure in a combustion chamber (cylinder pressure), as disclosed in JP-2004-100559A is proposed. In this apparatus, in a diesel engine (compression-ignition direct-injection engine) as a subject engine, cylinder pressure during engine running is measured by the cylinder pressure sensor, and the main ignition timing is detected based on an output from the sensor, or more particularly, by using correlation between the cylinder pressure and a heat generation rate. The occasional target value can be feedback-controlled to a desired value by variably setting a parameter which acts on the main ignition timing, i.e., a command value of main injection execution timing to a fuel injection valve for direct injection so as to reduce the deviation between a detection value of the main ignition timing and an occasional target value.

FIGS. 17A and 17B show the combustion characteristic (transition of heat generation rate) of a main injection obtained by the inventors by experiment regarding the apparatus disclosed in JP-2004-100559A. Note that FIGS. 17A and 17B are timing charts showing transition of an injection command to the fuel injection valve (pulse signal with a pulsewidth corresponding to injection time) and transition of heat generation rate as a heat amount per unit crank angle (unit output shaft turning angle) generated upon fuel combustion.

As shown in FIGS. 17A and 17B, main ignition timing (the timing can be detected in, e.g., in the waveform of heat generation rate, as timing at which the heat generation rate suddenly changes to the positive side around fuel injection timing) as ignition timing of main fuel injected by a main injection (combustion start timing) is changed in accordance with fuel property (e.g., a cetane number in light oil) More particularly, on a condition where the temperature of a combustion chamber is relatively low such as a low load condition, regarding a low cetane number fuel indicated with an alternate long and two short dashes line L51$b$ in FIGS. 17A and 17B, ignition delay time is longer and the heat generation rate is lower in comparison with a high cetane number fuel indicated with an alternate long and short dash line L51$a$ in FIGS. 17A and 17B.

The time required for fuel ignition in the case of the low cetane number fuel is longer in comparison with the high cetane number fuel, and the combustion rate as the amount of heat per unit fuel amount generated by fuel combustion (corresponding to combustibility) in the case of the high cetane number fuel is higher in comparison with the low cetane number fuel. In the case of the low cetane number fuel, in addition to ignitionability of fuel itself, the amount of heat generated by the pilot injection is smaller than that in the case of the high cetane number fuel, and the ignitionability in the cylinder (strictly, combustion chamber) is lower than that of the high cetane number fuel.

Accordingly, in the case of the low cetane number fuel, the ignition timing of combustion by the main injection (main ignition timing) is timing t50$b$ later than timing t50 in the case of the high cetane number fuel. Further, the time from pilot fuel ignition (timing t50$a$) to main fuel ignition (timing t50$b$) (interval between both timings) and the time from execution of main injection (start) to start of combustion (ignition) (main ignition delay time) in the case of the low cetane number fuel are longer than those in the case of the high cetane number fuel. In the case of the low cetane number fuel, as the main ignition delay time is longer, the pressure in the combustion chamber (cylinder pressure) at the main ignition timing and the combustion rate (combustibility) are lowered. Further, in the case of the low cetane number fuel, the maximum heat generation rate regarding the main injection (can be detected as e.g. a maximum point around the above-described main ignition timing in the waveform of heat generation rate) is also lower in comparison with the case of the high cetane number fuel.

In this manner, generally, the lower the cetane number is, the lower the maximum heat generation rate regarding the above-described main injection becomes. Accordingly, when fuel with extremely low cetane number is used, it is impossible to obtain a sufficient combustion amount (heat generation rate) and a sufficient torque. This may cause emission deterioration (white smoke or the like due to increased HC generation amount) and/or degradation of drivability, and at worst, an accidental fire.

According to the apparatus disclosed in JP-2004-100559A, the inventors have performed feedback control of main ignition timing based on variable setting of main injection execution timing (injection start timing), so as to control the main ignition timing in the case of the low cetane number fuel to about the same timing as that in the case of the high cetane number fuel (timing t50 in FIGS. 17A and 17B).

More particularly, a command value related to the above-described main injection execution timing (e.g., the pulse signal indicated in FIG. 17A) is corrected to the timing t52 on the advance side from the uncorrected timing t51 so as to control the detection value of the main ignition timing (the above timing t50b) obtained from the output from the cylinder pressure sensor to the timing t50 on the further advance side. In this arrangement, in the case of the low cetane number fuel, the main ignition timing can be controlled to the timing t50 (in FIGS. 17A and 17B, a solid line L52). Note that regarding correction of the above-described main injection execution timing (strictly, the command value of the main injection execution timing), pilot injection execution timing is also changed (corrected) to timing on the further advance side in correspondence with the change (correction) of the main injection execution timing so as to maintain a constant (or predetermined) interval between both injections.

However, even when the above-described control (feedback control on the main ignition timing) is performed in the case of the low cetane number fuel, the main ignition delay time is longer than that in the case of the high cetane number fuel since the combustion rate cannot be sufficiently increased by the pilot injection. Accordingly, when the above-described main injection execution timing (injection start timing) is advanced too much, a large amount of fuel injected from the start of the main injection, in addition to uncombusted fuel in the pilot injection, is ignited and combusted at once at the main ignition timing (the timing t50 in FIGS. 17A and 17B) as indicated with the solid line L52 in FIGS. 17A and 17B. This may cause excessive heat generation, and excessive rise of the cylinder pressure. When such excessive cylinder pressure rise occurs, noise and/or vibration may occur, otherwise, shock beyond the mechanical strength of the cylinder may be applied to the cylinder, and at worst, may reduce the life of the cylinder or break the cylinder.

SUMMARY OF THE INVENTION

The present invention has been made in consideration of the above situation, and provides a compression-ignition direct-injection engine combustion controller and an engine control system capable of improving the combustion characteristic of an internal combustion engine, and particularly, regarding main ignition timing, improving the combustion characteristic of main fuel supplied by a main injection.

The present invention provides a combustion controller for an engine system having a compression ignition engine that ignites and combusts fuel based on compression in a combustion chamber in a cylinder to generate power to an output shaft, and a fuel injector for directly injecting the fuel to the combustion chamber. The combustion controller controls an operation of at least one actuator in the system. The controller includes: ignition timing detection means for detecting main ignition timing as ignition timing (combustion start timing) of main fuel injected by a main injection mainly for generation of power to the output shaft or a parameter correlated with the timing, e.g., timing indicating a predetermined point in a waveform of heat generation rate as a heat generation amount per predetermined time; first correction means for correcting a first command value as a command value of main injection execution timing to the fuel injection valve in a direction to the side where a detection value by the ignition timing detection means is converged within a predetermined range, e.g., a fixed range, or a range variably set in correspondence with an engine running status at that time or the like; determination means for determining whether or not the first command value corrected by the first correction means is within a first allowable range as a predetermined range, from e.g. the first command value itself or a parameter which varies in correspondence with the first command value; second correction means for, when the determination means determines that the first command value is not within the first allowable range, correcting a second command value as a predetermined command value (one type of command value or plural types of command values may be used) other than the first command value among command values to actuators in the system, so as to move the detection value by the ignition timing detection means to a delay side or advance side in a same direction, in correspondence with whether or not the first command value is on the delay side or the advance side.

The inventors have detected that the main injection timing with the fuel injection valve can be converged within a range not to cause inconvenience such as noise (first allowable range) by controlling the main ignition timing by correcting not only the command value of the main injection timing to the fuel injection valve (first command value) but also other command value than the above command value (second command value), among the command values to the actuators in the system, and invented the above-described apparatus. That is, in this arrangement, when the main injection timing is advanced too much (or delayed too much) to advance (or delay) the main ignition timing and the determination means determines that the first command value is not within the first allowable range (excessively shifted from an expected position), the main ignition timing can be variably controlled secondarily in the same direction as the shift direction of the main injection timing by using other parameter. This secondary control using the other parameter brings back the main injection timing with the fuel injection valve in the allowable range. In this manner, according to the apparatus, the main ignition timing can be controlled while the main injection timing with the fuel injection valve is around a predetermined range (first allowable range), and the combustion characteristic of the internal combustion engine can be improved, and more particularly, the combustion characteristic related to the main ignition timing of the main fuel supplied by the main ignition can be improved.

More particularly, it is advantageous that the apparatus further includes means for repeatedly performing a series of processings, correction processing by the first correction means, determination processing by the determination means and correction processing by the second correction means, while a predetermined condition is established (e.g., always perform during engine running). In this arrangement, every time the first command value (corresponding to the main injection timing with the fuel injection valve) becomes out of the first allowable range, the first command value is brought back into the first allowable range. That is, in this arrangement, the main injection timing with the fuel injection valve can be automatically converged within a predetermined allowable range.

Further, regarding this arrangement, it is advantageous that the second correction means cumulatively changes the second command value by a predetermined change amount (e.g., a fixed value, or a variable value in correspondence with a predetermined parameter) every time the determination means determines that the first command value is not within the first allowable range. In this arrangement, the main injection timing with the fuel injection valve can be accurately converged within a predetermined allowable range.

Further, it is advantageous that the compression-ignition direct-injection engine combustion controller further includes: cumulative determination means for determining whether or not an integrated value of the change amount cumulated by the second correction means has exceeded an allowable upper limit; and means for, when the cumulative determination means determines that the integrated value of the change amount has exceeded the allowable upper limit, performing main ignition timing control by correction on a predetermined command value other than the first command value and the second command value among the command values to the actuators in the system, or predetermined fail safe processing. In this arrangement, inconvenience due to a control shift by the second correction means can be more preferably prevented or suppressed. When the main ignition timing can be controlled to a proper value with other command value than the first and second command values, the main ignition timing control can be executed. When the main ignition timing control cannot be executed (such command value does not exist), predetermined fail safe processing is performed so as to notify the situation or conduct some countermeasure. Note that as fail safe processing, processing of storing a diagnostic code in a nonvolatile memory, processing of turning on a predetermined warning lamp, or processing of emitting warning sound (predetermined music, a message or the like) or the like may be employed.

As described above, the inconvenience such as abrupt heat generation, and occurrence of noise due to combustion of large amount of fuel at once is caused by the uncombusted fuel injected by a pre-sub-injection (e.g., so-called pilot injection) to inject fuel (in e.g. an amount smaller than that in the main injection) prior to the main injection in one combustion cycle of the engine. Accordingly, it is particularly advantageous that the compression-ignition direct-injection engine combustion controller further includes pre-sub-injection execution means (e.g., injection means having an injection map including values for a pilot injection) for performing such pre-sub-injection (e.g., a pilot injection or a pre injection).

In this case, it is advantageous that the second command value is a command value related to an injection aspect (e.g., the number of injection steps, injection timing or injection amount) of the pre-sub-injection (e.g., so-called pilot injection) performed by the pre-sub-injection execution means among command values to the fuel injection valve. In this arrangement, the second correction means can be more easily and accurately realized.

Further, in this case, it is advantageous that the second command value is a command value related to an injection amount of a single-step pre-sub-injection performed by the pre-sub-injection execution means among command values to the fuel injection valve.

According to the experiment or the like by the inventors, when the a single-step injection (e.g., the above-described pilot injection) is performed as a pre-sub-injection prior to the main injection, the main ignition timing and the injection amount of the pre-sub-injection are well correlated with each other (see FIGS. 4A to 4E). Accordingly, the above-described arrangement is advantageous to realize the second correction means more easily and accurately.

Further, it is preferable that when the first correction means corrects the main injection execution timing to the advance side or the delay side, the pre-sub-injection execution timing is changed in the same direction as that of the advance or delay direction. In this case, it is desirable to change the execution timing of the pre-sub-injection to the advance or delay side by the same amount as that on the advance or delay side of the execution timing of the main injection.

In this arrangement, a desired interval can be maintained between the pre-sub-injection and the main injection (injection interval). Accordingly, when pressure fluctuates inside the fuel injection valve in accordance with execution of the pre-sub-injection, fluctuation of main injection amount due to the pressure fluctuation can be suppressed. In a case where both the pre-sub-injection and the main injection are performed, even when main injection execution timing is changed so as to control the ignition timing of the main injection, the main injection amount can be appropriately controlled, and stable fuel injection control can be realized.

Note that as the second command value, any other parameter than the above-described pre-sub-injection can be employed.

For example, a parameter which acts on at least one of cylinder pressure upon ignition (the higher the pressure is, the higher the ignitionability is), cylinder temperature upon ignition (the higher the temperature is, the higher the ignitionability is), the degree of mixture of air-fuel mixture upon ignition (the closer the degree of mixture to a sufficient value, the higher the ignitionability is), the amount of driving of an ignition auxiliary equipment (e.g., a glow plug) (the larger the amount is, the higher the ignitionability is), and the spray pattern of the injection valve, can be used.

Further, it is preferable that the first allowable range used by the determination means is a range defined by a predetermined first reference value and an allowable deviation amount from the first reference value. The determination means determines (e.g., in comparison with a predetermined threshold value) whether or not a deviation amount between the first command value corrected by the first correction means and the first reference value is smaller than the allowable deviation amount, and when the deviation amount is smaller than the allowable deviation amount, determines that the first command value is within the first allowable range.

Generally, a target value (predetermined reference value) is set for the main injection execution timing, and the closer to the target value the main injection execution timing is, i.e., the smaller the alienation (shift amount) between the main injection execution timing and the target vale, the more preferable combustion characteristic is obtained. Accordingly, the above arrangement is advantageous to easily and accurately set the first allowable range.

In this case, it is advantageous that the first reference value used by the determination means is an initial value of an injection control map in which the command value to the fuel injection valve is linked to a predetermined parameter related to the engine. In general vehicle engine control, an injection control map stored in a ROM is employed. Accordingly, an arrangement using such map has high practicability as a structure to set the first allowable range.

Further, it is advantageous that the ignition timing detection means detects the main ignition timing or a parameter correlated with the main ignition timing based on the detection signal outputted from the cylinder pressure sensor. In this arrangement having high practicability, the above-described main ignition timing or a parameter correlated with the timing can be detected with high precision.

Further, to improve the practicability and detection precision, it is advantageous that the ignition timing detection means obtains data transition (so-called waveform) of heat generation rate as a heat generation amount per predetermined time (e.g., unit time or unit number of output shaft revolutions) based on the detection signal outputted from the cylinder pressure sensor, and detects the main ignition timing or the parameter correlated with the main ignition timing based on the obtained data transition.

According to another aspect of the present invention, provided is a compression-ignition direct-injection engine combustion controller applied to an engine system, having a compression ignition engine that ignites and combusts fuel based on compression in a combustion chamber in a cylinder to generate power to an output shaft, and a fuel injection valve for direct injection that directly inject-supplies the fuel to the combustion chamber, for controlling an operation of at least one actuator in the system, comprising: ignition timing detection means for detecting main ignition timing as ignition timing of main fuel injected by a main injection mainly for generation of power to the output shaft or a parameter correlated with the timing; allowance condition determination means for determining whether or not a predetermined allowance condition is established; and first correction means for, only when the allowance condition determination means determines that the allowance condition is established, correcting a first command value as a command value of main injection execution timing to the fuel injection valve in a direction to the side where a detection value outputted from the ignition timing detection means is converged within a predetermined range.

Further, according to another aspect of the present invention, provided is a compression-ignition direct-injection engine combustion controller applied to an engine system, having a compression ignition engine that ignites and combusts fuel based on compression in a combustion chamber in a cylinder to generate power to an output shaft, and a fuel injection valve for direct injection that directly inject-supplies the fuel to the combustion chamber, for controlling an operation of at least one actuator in the system, comprising: ignition timing detection means for detecting main ignition timing as ignition timing of main fuel injected by a main injection mainly for generation of power to the output shaft or a parameter correlated with the timing; first correction means for correcting a first command value as a command value of main injection execution timing to the fuel injection valve in a direction to the side where a detection value by the ignition timing detection means is within a predetermined range; allowance condition determination means for determining whether or not a predetermined allowance condition is established; and means for, when the allowance condition determination means determines that the allowance condition is not satisfied, prohibiting or limiting update of a correction coefficient by the first correction means until the predetermined condition (e.g., the allowance condition) is established.

In the above apparatuses, when the allowance condition is not established, correction (update of correction coefficient) on the first command value (command value of the main injection execution timing to the fuel injection valve) is prohibited or limited. Accordingly, degradation of combustion characteristic (noise or the like) due to excessive correction can be more accurately prevented or suppressed.

More particularly, the allowance condition determination means determines whether or not the first command value corrected by the first correction means is within a first allowable range as a predetermined range, and when the first command value is within the first allowable range, determines that the allowance condition is established. In this arrangement, the degradation of combustion characteristic (noise or the like) due to the shift of the main ignition timing can be preferably prevented or suppressed.

Further, according to another aspect of the present invention, provided is a compression-ignition direct-injection engine combustion controller applied to an engine system, having a compression ignition engine that ignites and combusts fuel based on compression in a combustion chamber in a cylinder to generate power to an output shaft, and a fuel injection valve for direct injection that directly inject-supplies the fuel to the combustion chamber, for controlling an operation of at least one actuator in the system so as to control main ignition timing as ignition timing of main fuel injected by a main injection mainly for generation of power to the output shaft, wherein respective control laws are previously prepared in an executable aspect (e.g., stored as a program in a storage device) for first control to bring the main ignition timing closer to a target value by variably setting a first command value as a command value of main injection execution timing to the fuel injection valve, and second control to bring the main ignition timing closer to the target value also by variably setting a second command value as a predetermined command value other than the first command value among command values to actuators in the system, the apparatus further comprising control means for detecting the main ignition timing at that time or a parameter correlated with the main ignition timing, and when a difference between the main ignition timing and the target value is sufficiently small, performing the first control to bring the main ignition timing closer to the target value, while when the difference between the main ignition timing and the target value is not sufficiently small, performing the second control to bring the main ignition timing closer to the target value.

In this arrangement, the shift of the first command value is suppressed to a small value, and the degradation of combustion characteristic (noise or the like) due to the shift of the main ignition timing can be preferably prevented or suppressed.

In this case, when the difference between the main ignition timing and the target value is not sufficiently small, the control means performs the second control in a status where a control amount of the first command value is limited (e.g. within a predetermined range) so as to bring the main ignition timing closer to the target value. In this arrangement, the degradation of combustion characteristic (noise or the like) can be more infallibly prevented or suppressed.

As described above, when the time from execution (start) of the main injection to the start of fuel combustion (ignition) (main ignition delay time) is too long, inconvenience such as abrupt heat generation due to combustion of a large amount of fuel at once, and noise or the like occurs. On the other hand, in a direct injection engine, as fuel is directly injected into the cylinder, when the main ignition delay time is too short, sufficient time cannot be ensured as time for mixing intake air and fuel (previous mixing time) in the combustion chamber, and a desired combustion characteristic cannot be obtained.

According to another aspect of the present invention, provided is a compression-ignition direct-injection engine combustion controller applied to an engine system, having a compression ignition engine that ignites and combusts fuel based on compression in a combustion chamber in a cylinder to generate power to an output shaft, and a fuel injection valve for direct injection that directly inject-supplies the fuel to the combustion chamber, for controlling an operation of at least one actuator in the system, comprising: ignition delay time detection means for detecting main ignition delay time as time since injection of main fuel by a main injection mainly for generation of power to the output shaft to ignition of the main fuel (start of combustion), or a parameter correlated with the ignition delay time; and ignition delay time control means for variably setting an ignition delay command value as a predetermined command value (one type of command value or plural types of command values may be used) that acts on the main ignition delay time among command values to the actuators in the system, based on a detection value by the ignition delay time detection means.

In this arrangement, the main ignition delay time can be controlled to a proper value by the ignition delay time control means, and the inconvenience due to the above-described excessive ignition delay time can be preferably prevented or suppressed.

Note that as the above-described ignition delay time command value, a parameter which acts on fuel combustionability (combustion rate) in the combustion chamber can be used. For example, a parameter which acts on at least one of cylinder pressure upon ignition (the higher the pressure is, the higher the ignitionability is), cylinder temperature upon ignition (the higher the temperature is, the higher the ignitionability is), the degree of mixture of air-fuel mixture upon ignition (the closer the degree of mixture to a sufficient value, the higher the ignitionability is), the amount of driving of an ignition auxiliary equipment (e.g., a glow plug) (the larger the amount is, the higher the ignitionability is), and the spray pattern of the injection valve, can be used. Note that to more easily and accurately realize the ignition delay time control means, it is advantageous that the ignition delay command value is a command value related to an ignition aspect (e.g., the number of injection steps, injection timing or injection amount) of a pre-sub-injection (e.g., so-called pilot injection) to inject the fuel (by e.g. an injection amount smaller than that of the main injection) prior to execution of the main injection in one combustion cycle of the engine among command values to the fuel injection valve.

Further, in this case, it is advantageous that the command value related to the injection aspect of the pre-sub-injection is a command value related to an injection amount of a single-step pre-sub-injection among the command values to the fuel injection valve.

According to the experiment or the like by the inventors, when the a single-step injection (e.g., the above-described pilot injection) is performed as a pre-sub-injection prior to the main injection, the main ignition delay time and the injection amount of the pre-sub-injection are well correlated with each other (see FIGS. 4A to 4E). Accordingly, the above-described arrangement is advantageous to realize the second correction means more easily and accurately.

According to another aspect of the present invention, the ignition delay time detection means has: an injection timing detection unit that detects main injection start timing as start timing of the main injection by the fuel injection valve or a parameter correlated with the main injection start timing (e.g., timing of a predetermined point in a waveform of heat generation rate as a heat generation amount per predetermined time); an ignition timing detection unit that detects main ignition timing as ignition timing of the main fuel injected by the main injection mainly for generation of power to the output shaft or a parameter correlated with the main ignition timing; and an ignition delay time calculation unit that calculates main ignition delay time or a parameter correlated with the main ignition delay time based on respective detection values by the injection timing detection unit and the ignition timing detection unit.

In this arrangement, the ignition delay time detection means can be more easily and accurately realized.

More particularly, as the injection timing detection unit, it is advantageous that the injection timing detection unit detects the main injection start timing or the parameter correlated with the main injection start timing based on at least one of a command value to the fuel injection valve and a parameter indicating an operation status of the fuel injection valve (e.g., needle lift amount of the injection valve and rail pressure in a common rail system).

As the ignition timing detection unit, a unit corresponding to the ignition timing detection means can be employed. That is, a unit to detect the main ignition timing or a parameter correlated with the timing based on an output from the cylinder pressure sensor or the like can be advantageously employed.

As the ignition delay time control means, it is advantageous that the ignition delay time control means variably sets the ignition delay command value so as to bring the detection value by the ignition delay time detection means closer to a predetermined reference value, or the ignition delay time control means determines whether or not the detection value by the ignition delay time detection means is within a predetermined allowable range (e.g., set as a distance from a reference value), and when the detection value is not within the allowable range, corrects the ignition delay command value in a direction to a side in which the detection value is converged within the allowable range. In the use of such means, even when the main ignition delay time (strictly, the detection value of the main ignition delay time) is out of the allowable range, the ignition delay time control means controls the main ignition delay time to a predetermined reference value or into the allowable range. Thus the inconvenience due to the above-described shift of the ignition delay time can be preferably prevented or suppressed. Also in this case, the main ignition delay time can be automatically brought back to the reference value or into the allowable range.

According to another aspect of the present invention, provided is a compression-ignition direct-injection engine combustion controller applied to an engine system, having a fuel injection valve that directly injects fuel into a combustion chamber of a compression-ignition engine, for performing plural fuel injections (so-called multistep injection) with the fuel injection valve in one combustion cycle of the engine, and performing ignition timing feedback control so as to converge fuel ignition timing in a particular injection as a second or subsequent fuel injection among the plural fuel injections, to target timing, comprising: determination means for determining whether at least one of ignition timing difference between actual ignition timing and target timing in the particular injection or an ignition-timing feedback-control amount calculated based on the ignition timing difference, is equal to or greater than a predetermined value; and pre-injection control means for, when the determination means determines that one of the ignition timing difference or the ignition-timing feedback-control amount is equal to or greater than the predetermined value, changing an injection amount in a pre injection immediately before the particular injection.

In this arrangement, when at least one of the ignition timing deviation and the ignition-timing feedback-control amount in the particular injection (e.g., the main injection) is equal to or greater than the predetermined value, the ignition timing deviation or the ignition-timing feedback-control amount in the particular injection is reduced by changing the injection amount of a pre injection (e.g., the pilot injection) immediately before the particular injection. In this arrangement, the combustion characteristic in the internal combustion engine, and more particularly the combustion characteristic related to ignition timing of fuel by the particular injection (main injection) can be improved.

Further, when the ignition timing difference or the ignition-timing feedback-control amount indicates that the actual ignition timing is delayed from the target timing, the pre-injection control means increases the injection amount of the pre injection, while when the ignition timing difference or the ignition-timing feedback-control amount indicates that the actual ignition timing is advanced from the target timing, the pre-injection control means reduces the injection amount of the pre injection. According to the inventors, the increment of the injection amount of the pre injection quickens the fuel ignition timing of an immediately subsequent particular injection, on the other hand, the decrement of the injection amount of the pre injection slows the fuel ignition timing of the immediately subsequent particular injection. Accordingly, an arrangement to reduce the ignition timing deviation or the ignition timing feedback control amount in the particular injection can be realized.

Note that it is preferable that the predetermined value for comparative determination of the ignition timing difference or the ignition-timing feedback-control amount is variably set based on the target ignition timing of the particular injection. In this arrangement, even in a case where the target ignition timing of the particular injection is changed in correspondence with occasional engine running status or the like, a proper combustion characteristic can be realized.

Further, it is preferable that when execution timing of the particular injection is changed to an advance side or a delay side in the ignition-timing feedback control on the particular injection, the execution timing of the particular injection is changed in the same direction as the advance or delay direction. In this case, it is desirable to change the execution timing of the pre-sub-injection to the advance or delay side by the same amount as that on the advance or delay side of the execution timing of the main injection.

In this arrangement, a desired interval can be maintained between the pre-sub-injection and the main injection (injection interval). Accordingly, when pressure fluctuates inside the fuel injection valve in accordance with execution of the pre-sub-injection, fluctuation of main injection amount due to the pressure fluctuation can be suppressed. In a case where both the pre-sub-injection and the main injection are performed, even when main injection execution timing is changed so as to control the ignition timing in the main injection, the main injection amount can be appropriately controlled, and stable fuel injection control can be realized.

Note that when the apparatus is used for engine control not by the above-described combustion controller but a larger unit, in accordance with business category or purpose, the engine control system may include other related apparatuses (e.g., various apparatuses related to control of sensors and actuators) than the combustion controller. The present invention provides an engine control system having the compression-ignition direct-injection engine combustion controller, the actuator in the engine system as the control subject for the combustion controller, and engine control means for performing predetermined control on the engine based on the actuation of the actuator (e.g., torque control of engine output shaft, revolution speed control of the like).

BRIEF DESCRIPTION OF THE DRAWINGS

The above and other object, features and advantages of the present invention will become more apparent from the following detailed description when taken in conjunction with the accompanying drawings wherein.

DETAILED DESCRIPTION OF THE PREFERRED EMBODIMENTS

<First Embodiment>

Hereinbelow, a first embodiment in which a compression-ignition direct-injection engine combustion controller and an engine control system according to the present invention are embodied will be described with reference to FIGS. 1 to 3, 4A to 4E, 5, FIGS. 6A and 6B, and FIGS. 7 to 9, Note that the engine control system according to the present embodiment is a common-rail fuel-injection control system (high-pressure fuel supply system) to control a compression-ignition diesel engine (internal combustion engine) as a vehicle power source. In this system, as in the case of the system disclosed in the above JP-2004-100559A, high pressure fuel (e.g., light oil at "1000 atm" or higher injection pressure) is directly inject-supplied (direct-injection supplied) to a combustion chamber (a portion to conduct fuel combustion) in an engine cylinder.

Figure 1:
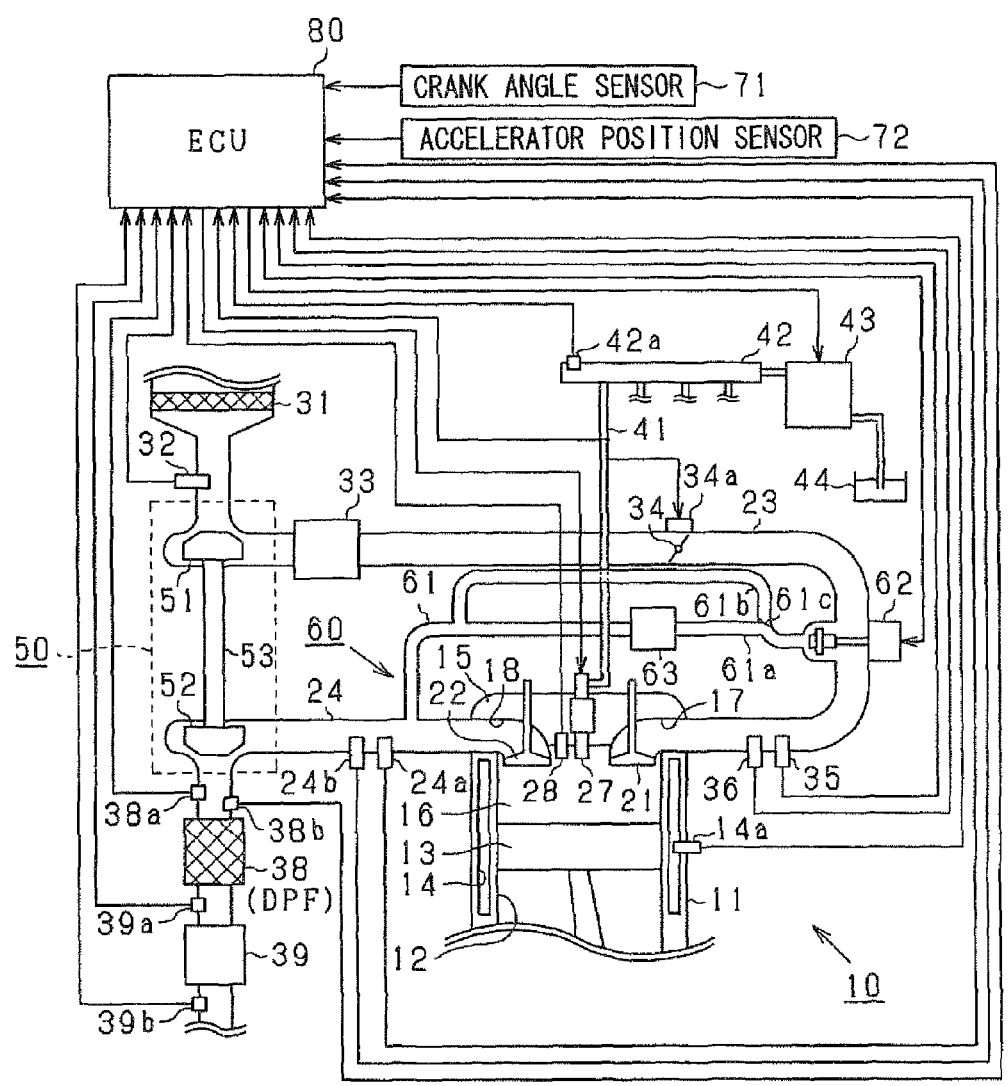
FIG. 1 is a block diagram schematically showing a compression-ignition direct-injection engine combustion controller according to the present invention and an engine control system according to a first embodiment of the present invention in which the combustion controller is incorporated.

A configuration of the engine control system according to the present embodiment will be schematically described with reference to FIG. 1. In FIG. 1, signal lines correspond to wire layout. Note that as the engine to be controlled in this system (engine 10 in FIG. 1), a multicylinder (e.g., serial 4 cylinder) engine for 4-wheel vehicle is assumed. Note that in FIG. 1, for the sake of convenience of explanation, one cylinder (cylinder 12 in FIG. 1) is shown. The engine 10 is a 4-stroke reciprocating direct-injection engine (internal combustion engine). That is, in the engine 10, a cylinder as a subject of combustion at that time is sequentially determined by a cylinder determination sensor (electromagnetic pickup) provided on a camshaft (not shown) of exhaust valves 21 and 22. For example, regarding four cylinders #1 to #4 including the cylinder 12 as the cylinder #1, one combustion cycle having four steps, intake, compression, combustion and exhaustion, is sequentially performed at "720° CA" period, or more specifically, shifted between the cylinders by "180° CA", on the cylinder #1, then the cylinder #3, then the cylinder #4, and the cylinder #2. As the four cylinders #1 to #4 have basically the same structure, the engine system will be described using the one cylinder 12.

As shown in FIG. 1, the engine control system has the diesel engine 10 having a common-rail fuel-injection device as a control subject, various sensors, an ECU (Electronic Control Unit) 80 and the like to control the engine 10.

The engine 10 as a control subject basically has a structure where a piston 13 is accommodated in the cylinder 12 formed in a cylinder block 11. The crank shaft as an output shaft (not shown) is rotated by reciprocating motion of the piston 13.

The cylinder block 11 is provided with a cooling water channel (water jacket) 14 to circulate cooling water in the engine 10 and a cooling-water temperature sensor 14a to detect the temperature of cooling water (cooling water temperature) in the cooling water channel 14. The engine 10 is cooled with the cooling water. Further, a cylinder head 15 is fixed to an upper end surface of the cylinder block 11. A combustion chamber 16 is formed between the cylinder head 15 and a top of the piston 13.

In the cylinder head 15, an intake port 17 (intake orifice) and an exhaust port 18 (exhaust orifice), opened in the combustion chamber 16, are formed in respectively two positions (total four ports) in one cylinder. These intake port 17 and exhaust port 18 are opened/closed with an intake valve 21 and an exhaust valve 22 driven with a cam (not shown) (more specifically, a cam attached to a camshaft interlocked with the crankshaft). Further, to realize communication between the combustion chamber 16 in the cylinder 12 and the outside of the vehicle (ambient air) through these ports, an intake pipe (intake manifold) 23 to take the ambient air (new air) into the respective cylinders is connected to the intake port 17, and an exhaust pipe (exhaust manifold) 24 to discharge combusted gas (exhaust) from the respective cylinders is connected to the exhaust port 18.

The intake pipe 23 forming an intake system of the engine 10 is provided with an air cleaner 31 in a top-stream position of the intake pipe 23, and an air flow meter 32 (e.g., a hot-wire air flow meter) to detect the amount of air (new air amount) taken, while foreign materials are removed through the air cleaner 31, on the downstream side from the air cleaner 31, and output the amount as an electric signal. An inter-cooler 33 to cool the intake air is provided on the downstream side of the air flow meter 32. Further, an electronic-controlled throttle valve 34 electronically opening-controlled by an actuator such as a DC motor, and a throttle opening sensor 34a to detect the opening and motion (opening change) of the throttle valve 34 are provided on the downstream side of the inter-cooler 33. Further, an intake pressure sensor 35 to detect intake pressure and output the pressure as an electric signal and an intake temperature sensor 36 to detect intake temperature and output the temperature as an electric signal are provided around the intake port 17 on the further downstream side.

In the exhaust pipe 24 forming an exhaust system of the engine 10, an exhaust pressure sensor 24a to detect exhaust pressure and output the pressure as an electric signal and an exhaust temperature sensor 24b to detect exhaust temperature and output the temperature as an electric signal are provided around the exhaust port 18. Further, as a post-exhaust processing system to perform exhaust emission purification, a DPF (Diesel Particulate Filter) 38 to collect PM in exhaust and an NOx occlusion reduction type catalyst 39 (hereinafter, referred to as an "NOx catalyst 39) to purify NOx in the exhaust are provided on the further downstream side.

In the present embodiment, the DPF 38 is provided on the exhaust upstream side of the NOx catalyst 39.

The DPF 38 is a continuously regenerating PM removal filter to collect PM (Particulate Matter) in the exhaust. For example, the DPF 38 can be continuously used by repeatedly combustion-removing the collected PM (corresponding to regeneration processing) by post injection or the like. Further, as the DPF 38 holds a platinum oxidation catalyst (not shown), the DPF 38 can remove HC and CO in addition to soluble organic fraction (SOF) as one of PM component.

The NOx catalyst 39 is formed with e.g. alkaline earth material (occlusion material) and platinum. When the atmosphere of exhaust is in lean air-fuel ratio status (the fuel ratio is lower than ideal air-fuel ratio), the NOx catalyst 39 occlude NOx in exhaust. When the air-fuel ratio is rich (the fuel ratio is higher than the ideal air-fuel ratio), the NOx catalyst 39 reduce-removes the occluded NOx using reduction components such as HC and CO in the exhaust. The NOx in the exhaust can be purified by repetition of occlusion and reduction (discharge) of NOx by the NOx catalyst 39, thus the amount of NOx discharge can be reduced.

In the exhaust pipe 24, an exhaust temperature sensor 38a to detect exhaust temperature and an A/F sensor 38b to detect oxygen concentration in the exhaust are provided on the upstream side of the DPF 38. On the other hand, A/F sensors 39a and 39b are provided on the upstream side and the downstream side of the NOx catalyst 39. These A/F sensors 38b, 39a and 39b output an oxygen concentration detection signal corresponding to occasional oxygen concentration in exhaust, and air-fuel ratio calculation is sequentially performed based on the oxygen concentration detection signals. The oxygen concentration detection signals as sensor outputs from these A/F sensors 38b, 39a and 39b are controlled so as to linearly vary in correspondence with the oxygen concentration. Note that the exhaust temperature sensor 38a and the A/F sensors 38b, 39a and 39b play a particularly important role in the reduction processing using the DPF 38 and NOx catalyst 39, and these sensors are mainly used for detection of start/termination timing of the reduction processing.

In this system, a turbo charger 50 is provided between the intake pipe 23 and the exhaust pipe 24. The turbo charger 50 has an intake compressor 51 provided in the middle of the intake pipe 23 (between the air flow meter 32 and the inter-cooler 33) and an exhaust turbine 52 provided in the middle of the exhaust pipe 24 (on the upstream side of the exhaust temperature sensor 38a). The compressor 51 and the turbine 52 are coupled with each other via a shaft 53. That is, the exhaust turbine 52 is rotated with exhaust flowing through the exhaust pipe 24, then the rotation of the turbine 52 is transmitted via the shaft 53 to the intake compressor 51, and air flowing through the intake pipe 23 is compressed by the intake compressor 51 and supercharging is performed. The charging efficiency of intake air to each cylinder is increased by this supercharging, and at this time, the supercharged air is cooled by the inter-cooler 33. Accordingly, the charging efficiency to each cylinder is further increased.

An EGR device 60 to recirculate (reflow) a part of the exhaust as EGR (Exhaust Gas Recirculation) gas to the intake system is also provided between the intake pipe 23 and the exhaust pipe 24. The EGR device 60 is briefly constructed with an EGR piping 61 provided so as to connect the intake pipe 23 with the exhaust pipe 24 around the intake and exhaust ports and an EGR valve 62 having an electromagnetic valve or the like provided on the downstream side from the throttle valve 34. In accordance with the valve opening of the EGR valve 62, the passage area of the EGR piping 61, and the EGR rate (the rate of EGR gas returned to the cylinder with respect to the entire exhaust) can be controlled. For example, when the EGR valve 62 is fully opened, the EGR piping 61 is blocked, and the EGR amount is "0". More specifically, the EGR piping 61 (connecting passage of the intake and exhaust passages) is branched to two pipings (branch passages 61a and 61b) in a predetermined portion on the exhaust side, then again integrated on the exhaust downstream side (intake side), and connected via the EGR valve 62 to the intake passage. The branch passage 61a is provided with a water-cooling EGR cooler 63 (cooling device) to cool EGR gas passing through the branch passage 61a with cooling water. By using the EGR cooler, heat radiation amounts by gas distribution from the branch portion (the exhaust side) to the integration portion (the intake side) in the two branch passages 61a and 61b are different from each other.

Further, in the integration portion of the two branch passages 61a and 61b, a bypass valve 61c is provided to variably set the distribution area (closing degree) of one of the branch passage 61a and 61b and release the other passage. In the EGR device 60, the exhaust backflow route is determined in accordance with the status of the bypass valve 61c. That is, assuming that the exhaust temperature is "500° C.", when the branch passage 61a is selected as a flowback route, the EGR gas is cooled by the EGR cooler 63 and the exhaust temperature becomes about "100° C.". On the other hand, when the branch passage 61b is selected, the EGR gas is not cooled by the EGR cooler 63, and the exhaust temperature becomes about "300° C.". In the EGR device 60 having this structure, as a part of the exhaust is recirculated to the intake system through the EGR piping 61, the combustion temperature is lowered and the occurrence of NOx is reduced. Further, through the selection of flowback route (switching) using the bypass valve 61c and the variable control of the distribution area, the intake temperature can be controlled (variably controlled).

In the cylinder 12, the combustion chamber 16 is provided with an electromagnetic injector (fuel injection valve) 27 to directly inject-supply fuel (light oil) as fuel combusted in the combustion chamber 16 into the cylinder 12 and a cylinder pressure sensor 28 to measure the pressure in the cylinder 12 (cylinder pressure) with a detection unit positioned in the combustion chamber 16 (an end of a probe inserted in the combustion chamber 16) and output a detection signal (electric signal) corresponding to the measured value. Note that for the sake of convenience, the injector 27 and the cylinder pressure sensor 28 provided in one cylinder (cylinder 12) are shown, however the injector and the sensor are provided in the respective cylinders in the engine 10. The respective injectors in the engine 10 including the above-described injector 27 are connected to a fuel tank 44 via a fuel piping 41, a common rail 42 and a fuel pump 43. That is, fuel in the fuel tank 44 pumped with the fuel pump 43 via a filter (not shown) is pressurized to a predetermined fuel pressure (e.g., to or higher than "1000 atm") in the common rail 42 as a pressure accumulation piping, and distributed (supplied) to the respective injectors through the fuel piping 41. Further, the common rail 42 is provided with a fuel pressure sensor 42a to detect fuel pressure (common rail pressure) in the common rail 42, thus management of fuel injection pressure of the respective injectors in the engine 10 is realized.

Figure 2:
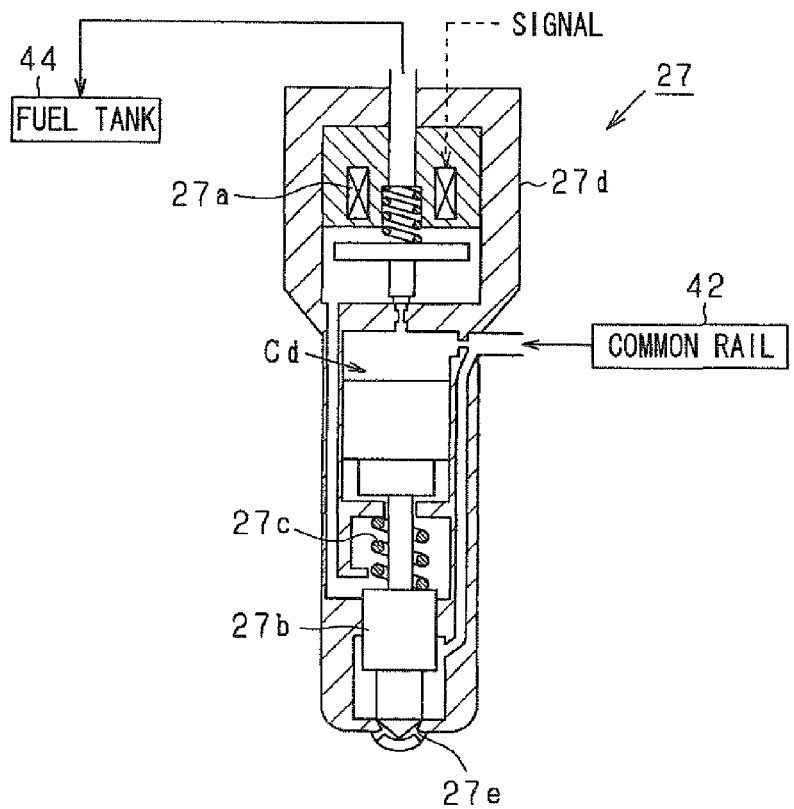
FIG. 2 is a cross-sectional view schematically showing an internal structure of a fuel injection valve used in the engine control system.

FIG. 2 is a cross-sectional view schematically showing an internal structure of the fuel injector 27. Note that the injector 27 according to the present embodiment is a hydraulic fuel injection valve utilizing engine fuel for combustion (fuel in the fuel tank 44). The drive power transmission upon fuel injection is performed via a hydraulic chamber (command chamber).

As shown in FIG. 2, the injector 27 is an inward opening type fuel injection valve as a so-called normally-close type fuel injection valve which is closed when nonenergized. That is, in the injector 27, sealing degree of a hydraulic chamber Cd, and pressure in the hydraulic chamber Cd (corresponding to back pressure of a needle 27b) is increased/reduced in correspondence with energization status (energized/non-energized status) of a solenoid 27a forming a two-way electromagnetic valve. In accordance with the pressure increment/decrement, the needle 27b is reciprocated (moved upward/downward) in a valve cylinder (in a housing 27d) following or against the tension force of a spring 27c (coil spring). With this motion, a fuel supply passage to an injection orifice 27e (formed in correspondence with a required number) is opened/closed in the middle (more specifically, with a tapered sheet surface on/from which the needle 27b is attached/removed based on the reciprocating motion). At this time, drive control of the needle 27b is performed through so-called PWM (Pulse Width Modulation) control. That is, a pulse signal (energizing signal) is sent from an ECU 80 to a driving member for the needle 27b (the above-described two-way electromagnetic valve). The lift amount of the needle 27b (the degree of separation from the sheet surface) is variably controlled based on the pulse width (corresponding to energizing time). Upon the drive control, the lift amount is increased as the energizing time is long, and as the lift amount is increased, the injection rate (fuel amount injected per unit time) is increased. Note that pressure intensifying processing in the hydraulic chamber Cd is performed by fuel supply from the common rail 42. On the other hand, pressure reduction processing in the hydraulic chamber Cd is performed by returning the fuel in the hydraulic chamber Cd to the fuel tank 44 through a piping (not shown) connecting the injector 27 to the fuel tank 44.

The above-described injector 27 has the needle 27b to open and close the injector 27 by opening/closing (releasing/closing) the fuel supply passage to the injection orifice 27e based on a predetermined reciprocating motion inside the valve main body (housing 27d). In a non-driven status, the needle 27b is displaced to the valve-closing side by a force stationarily-applied to the valve-closing side (the tension with the spring 27c). In a driven status, the needle 27b is displaced to the valve-opening side against the tension of the spring 27c by application of the driving force. At this time, in the non-driven status and the driven status, the lift amount of the needle 27b is approximately symmetrically changed.

In the engine 10, a predetermined amount of fuel is inject-supplied at any time to the respective cylinders by valve-opening drive of these injectors 27. That is, upon driving of the engine 10, intake air is introduced from the intake pipe 23 to the combustion chamber 16 of the cylinder 12 by an opening operation of the intake valve 21, and the intake air is mixed with the fuel inject-supplied from the injector 27. This air-fuel mixture is compressed with the piston 13 in the cylinder 12 then ignited (self-ignited) and combusted, and then exhaust after the combustion is discharged to the exhaust pipe 24 by an opening operation of the exhaust valve 22.

Further, in the vehicle (not shown), in addition to the above-described respective sensors, various sensors for vehicle control are provided. For example, a crank angle sensor 71 (e.g., an electromagnetic pickup) to output a crank angle signal by a predetermined crank angle (e.g., at 30° CA period) is provided on the outer peripheral side of the crankshaft as an output shaft of the engine 10, so as to detect a turning angle position, a revolution speed (engine speed) or the like of the crankshaft. Further, an accelerator pedal is provided with an accelerator position sensor 72 which outputs an electric signal corresponding to the status (displacement amount) of the accelerator pedal, to detect the amount of operation of the accelerator pedal by a driver (pedal depression amount).

In this system, the ECU 80 functions as the combustion controller according to the present embodiment and performs engine control as an electronic control unit. The ECU 80 (engine control ECU) having a well-known microcomputer (not shown) grasps the running status of the engine 10 based on detection signals from the above-described various sensors and the user's requirement, and, in correspondence with the engine running status and the user's requirement, operates various actuators for the throttle valve 34 and the injector 27 and the like, to perform various controls related to the above-described engine 10 in an optimum aspect corresponding to occasional situation.

The microcomputer incorporated in the ECU 80 basically has an arithmetic unit, storage devices, signal processing units, a communication unit, a power source circuit and the like including a CPU (Central Processing Unit) to perform various calculations, a RAM (Random Access Memory) as a main memory for temporarily storing calculation intermediate data, calculation results and the like, a ROM (Read Only Memory) as a program memory, an EEPROM (Electrically Erasable Programmable Read Only Memory) as a data storage memory, a backup RAM (a memory always power-supplied from a backup power source such as an on-vehicle battery after stoppage of main power source of the ECU), signal processing units such as an A/D converter and a clock generator, input/output ports for signal input/output to/from the outside. Further, in the present embodiment, in addition to the above-described CPU, a high-speed digital signal processor (DSP) is provided, to increase the processing speed of signal processing in the control (particularly signal processing related to an output from the cylinder pressure sensor 28). The ROM previously holds various programs related to engine control (control law) including a program related to the ignition timing control, a control map and the like. Further, the data storage memory (e.g., an EEPROM) previously holds various control data and the like such as design data of the engine 10.

In the present embodiment, the ECU 80 calculates torque to be generated on the output shaft (crankshaft) (torque requirement) at that time, and, a fuel injection quantity to satisfy the torque requirement, based on occasionally-input various sensor outputs (detection signal). Thus, as the fuel injection quantity of the injector 27 is variably set, indicated torque generated through fuel combustion in the above-described cylinder (combustion chamber) (generated torque), and, the shaft torque actually outputted to the output shaft (crankshaft) (output torque) is controlled (brought into correspondence with the torque requirement). That is, the ECU 80 calculates a fuel injection quantity correspondence with e.g. the occasional engine running status and the amount of accelerator pedal depression by the driver, and in synchronization with desired injection timing, outputs an injection control signal (driving amount) indicating fuel injection by the calculated fuel injection quantity to the above-described injector 27. Thus the above-described output torque of the engine 10 is controlled to a target value based on the driving amount of the injector 27 (e.g. valve opening time). In the present embodiment, such unit to perform the torque control (more specifically the program in the ECU 80) corresponds to the "engine control means".

Figure 3:
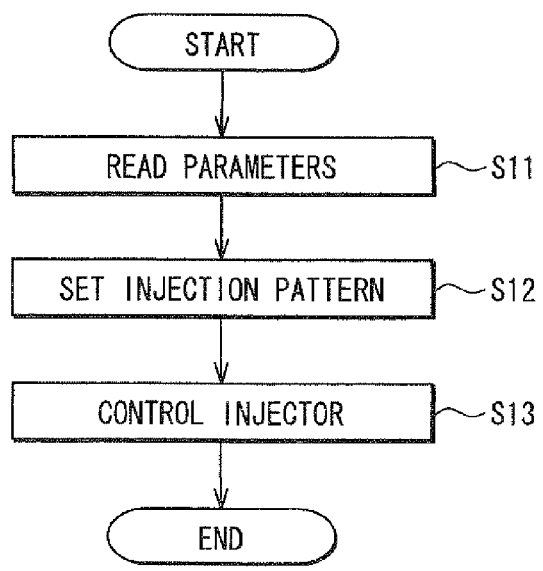
FIG. 3 is a flowchart showing basic processing procedure of fuel injection control according to the first embodiment.

In the diesel engine, in stationary running, for the purpose of increasing the amount of new air and reducing pumping loss, an intake throttle valve (throttle valve 34) provided in the intake passage of the engine 10 is held in an approximately full-opened status. Accordingly, as combustion control in stationary running (particularly combustion control related to torque control), control of fuel injection quantity is mainly performed. Hereinbelow, a basic procedure of fuel injection control according to the present embodiment will be described with reference to FIG. 3. Note that various parameter values used in the processing in FIG. 3 are stored at any time in the storage device incorporated in the ECU 80 such as a RAM, an EEPROM or a backup RAM and updated at any time in accordance with necessity. Basically the series of processings in the respective figures are sequentially performed once per one combustion cycle in each cylinder of the engine 10 by execution of the program stored in the ROM in the ECU 80. That is, in accordance with the program, the fuel is supplied to all the cylinders except a halt cylinder in one combustion cycle.

As shown in FIG. 3, in the series of processings, first, at Step S11, predetermined parameters, e.g., an engine speed (actual measurement value by the crank angle sensor 71) and rail pressure (actual measurement value by the fuel pressure sensor 42a) at that time, and an accelerator operation amount by the driver (actual measurement value by the accelerator sensor 72) and the like at that time are read. Then at Step S12, an injection pattern is set based on the various parameters read at Step S11 (further, torque requirement including loss due to external load and the like is calculated in accordance with necessity). For example, in the case of single-step injection, an injection amount (injection time) is variably set, and in the case of multistep injection, the total injection amount of respective injections (injection time) is variably set, in correspondence with torque to be generated on the above-described output shaft (crankshaft) (torque requirement i.e. torque corresponding to engine load at that time). Then, a command value (command signal) to the above-described injector 27 is set based on the injection pattern. In this arrangement, in correspondence with vehicle status or the like, the above-described pilot injection, pre injection, after injection, post injection and the like, along with main injection, are appropriately performed.

The injection pattern is obtained based on e.g. a predetermined basic injection map (injection control map, or an expression or the like is available) stored in the above-described ROM and a correction coefficient. For example, regarding the assumed range of the above-described predetermined parameters (Step S11), an optimum injection pattern (conforming value) is previously obtained by experiment or the like and is written in the basic injection map. The injection pattern is determined based on the parameters such as the number of injection steps (the number of injections per one combustion cycle), injection timings of respective injections and injection periods (corresponding to injection amounts). The basic injection map shows the relation between these parameters and the optimum injection pattern. The injection pattern obtained with the map is corrected based on the correction coefficient (stored in e.g. the EEPROM in the ECU 80) which has been separately updated (details will be described later) (for example, expression "set value=value on the map+correction coefficient" is calculated). Then an injection pattern at that time, and by extension, a command signal to the above-described injector 27 corresponding to the injection pattern is obtained. Note that the setting of the above-described injection pattern (Step S12) may be performed by using respective maps separately set for the elements of the injection pattern (the above-described number of injection steps and the like) or by using a map including plural (e.g. all) the respective elements of the injection pattern.

The injection pattern set as above, and the command value (command signal) corresponding to the injection pattern is used at Step S13. At Step S13, based on the command value (command signal) (more specifically, the command signal is outputted to the above-described injector 27), driving of the injector 27 is controlled. Then, with the drive control of the injector 27, the series of processing in FIG. 3 is ended.

In the present embodiment, fuel is supplied to the engine 10 through this fuel injection control. Prior to execution of a main injection mainly to generate output torque in one combustion cycle in the engine 10, a pilot injection, i.e., a pre-sub-injection by injection amount smaller than that of the main injection (minute amount) is performed. This arrangement suppresses combustion noise and reduces NOx. Further, as in the case of the apparatus shown in FIG. 17, the combustion controller according to the present embodiment also has a program (first correction means) to variably set (correct) a command value of main injection execution timing (first command value), among command signals to the above-described injector 27, so as to move a detection value of main ignition timing obtained from an output from the cylinder pressure sensor 28 to the side where the value is converged within a predetermined allowable range. Note that in the present embodiment, the combustion controller further has a program (determination means) to determine whether or not the command value corrected with the program (corrected first command value) is within the predetermined allowable range (first allowable range), and a program (second correction means) to correct the injection amount of the above-described pilot injection when it is determined that the command value is not within the allowable range, so as to move the main ignition timing (strictly a detection value of the main ignition timing) to the delay side or advance side in the same direction in correspondence with whether the command value is on the delay side or advance side in the allowable range. Hereinbelow, ignition timing control by the combustion controller according to the present embodiment will be described with reference to FIGS. 4A to 4E, FIG. 5 and FIGS. 6A and 6B. In this embodiment, as an example, an injection pattern having a pilot injection and a main injection (2-step injection) is performed. Note that in the present embodiment, a unit to perform the pilot injection (specifically, a program to perform the processing in FIG. 3 among the programs in the ECU 80) corresponds to "pre-sub-injection execution means".

Figure 4A:
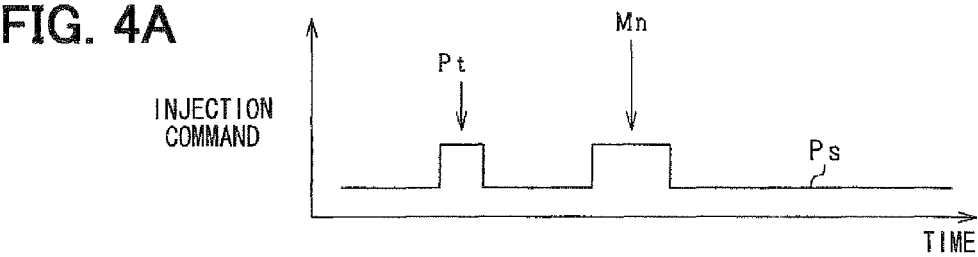
FIG. 4A is a timing chart showing transition of an injection command to the fuel injection valve.
Figure 4B:
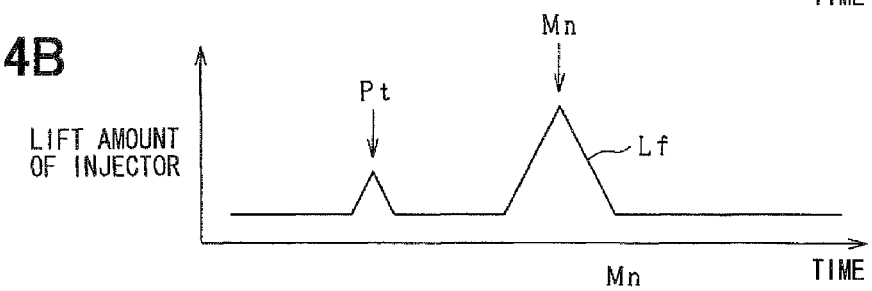
FIG. 4B is a timing chart showing transition of a status of the fuel injection valve (needle lift amount)
Figure 4C:
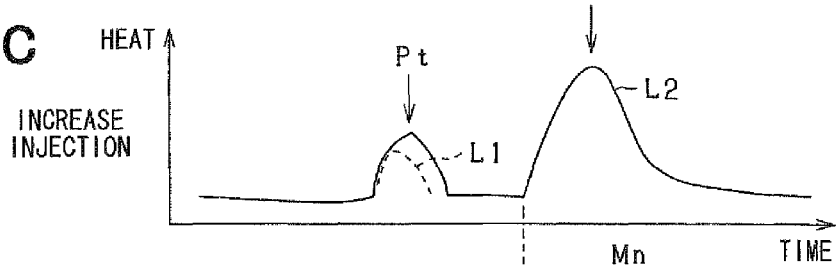
FIGS. 4C to 4E are timing charts showing transition of heat generation rate in pilot injections by three different types of injection amounts (amount-increased injection, reference injection and amount-reduced injection)
Figure 4D:
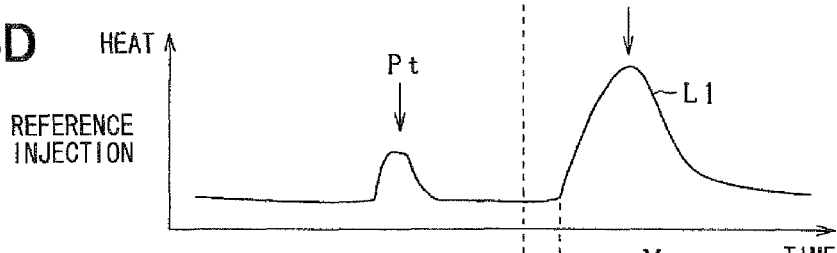
Figure 4E:
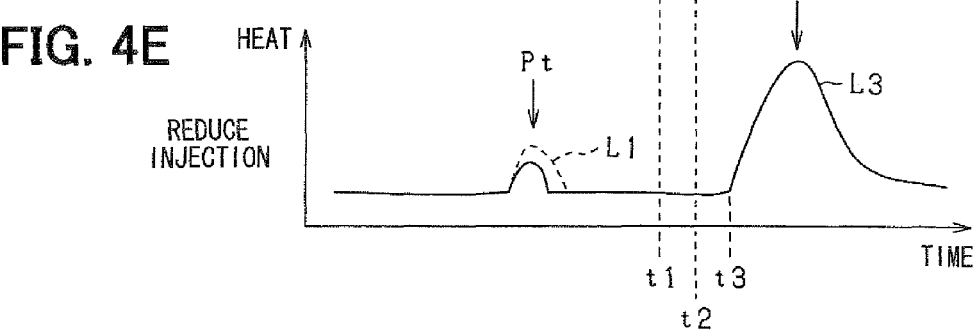

First, the relation between the injection amount of the pilot injection (pre-sub-injection) and a combustion characteristic upon main injection (main ignition timing, main injection start timing and the like) will be described with reference to FIGS. 4A to 4E. FIG. 4A is a timing chart showing transition of the injection command to the above-described injector 27. FIG. 4B is a timing chart showing transition of the status of the injector 27 (lift amount of the needle 27b). FIGS. 4C to 4E are timing charts showing transition of heat generation rate (heat generation amount per unit time) in combustion in the cylinder 12 in pilot injections by three different types of injection amounts (amount-increased injection, reference injection and amount-reduced injection).

In the example shown in FIGS. 4A to 4E, when a pulse signal Ps shown in FIG. 4A is supplied to the above-described injector 27, the lift amount of the injector 27 (the lift amount of the needle 27b) is changed as indicated with a solid line Lf shown in FIG. 4B. The time from the start of energization of the above-described injector 27 (rising of the pulse signal Ps) to the actual fuel injection corresponds to a solid invalid injection time (operation delay of the injector 27). Then, as shown in FIGS. 4C to 4E, the ignition timing by the following main injection, and time from execution (start) of the main injection to start of combustion (ignition) (main ignition delay time) is changed in correspondence with the injection amount of the pilot injection. More particularly, as indicated with a solid line L1 in FIG. 4D, in a reference injection to perform a pilot injection Pt by a reference injection amount (injection amount to obtain a desired combustion status), combustion by a main injection Mn is started (ignited) at timing t2. On the other hand, as indicated with a solid line L2 in FIG. 4C, in an amount-increased injection to perform the pilot injection Pt by an injection amount larger than the reference amount (broken line L1), combustion by the main injection Mn is started (ignited) at timing t1 earlier than that of the reference injection timing.

Further, as indicated with a solid line L3 in FIG. 4E, in an amount-reduced injection to perform the pilot injection Pt by an injection amount smaller than the reference amount (broken line L1), combustion by the main injection Mn is started (ignited) at timing t3 later than the reference injection timing. In this manner, it is confirmed by the experiment or the like by the inventors that as the injection amount of the pilot injection is increased, ignition timing of combustion by the main injection is quickened, and the main ignition delay time is reduced.

Figure 5:
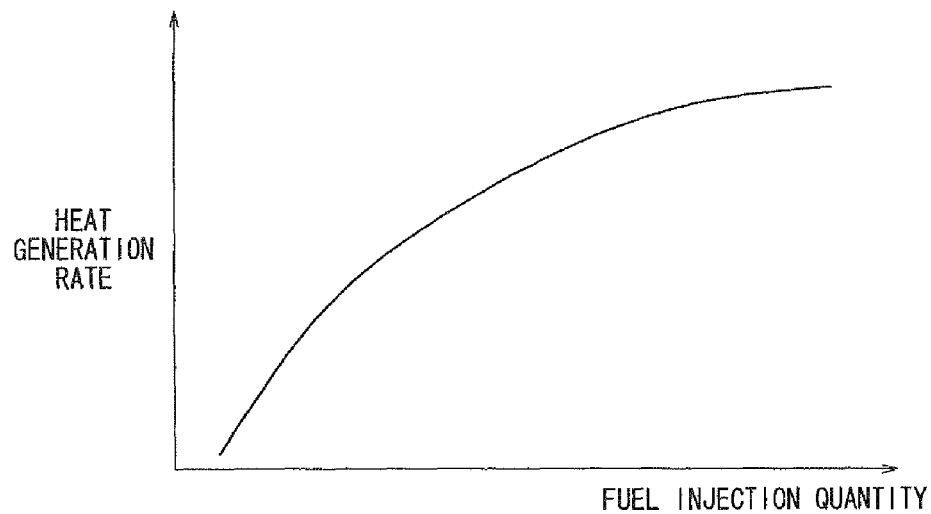
FIG. 5 is a graph showing the relation between a fuel injection quantity and heat generation rate in a minute injection amount region.

Further, regarding an injection by a minute injection amount as in the case of the pilot injection, the relation between a fuel injection quantity and heat amount per unit crank angle (unit output-shaft turning angle) (heat generation rate) generated by combustion of the injected fuel is as shown in FIG. 5. That is, as the fuel injection quantity is increased, the heat generation rate is increased.

Figure 6A:
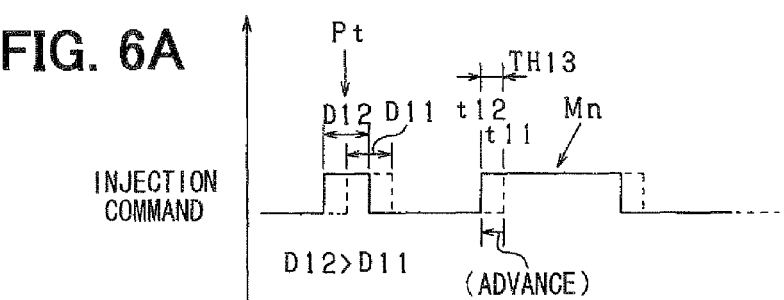
FIGS. 6A and 6B are timing charts showing an aspect of ignition timing control according to the first embodiment.
Figure 6B:
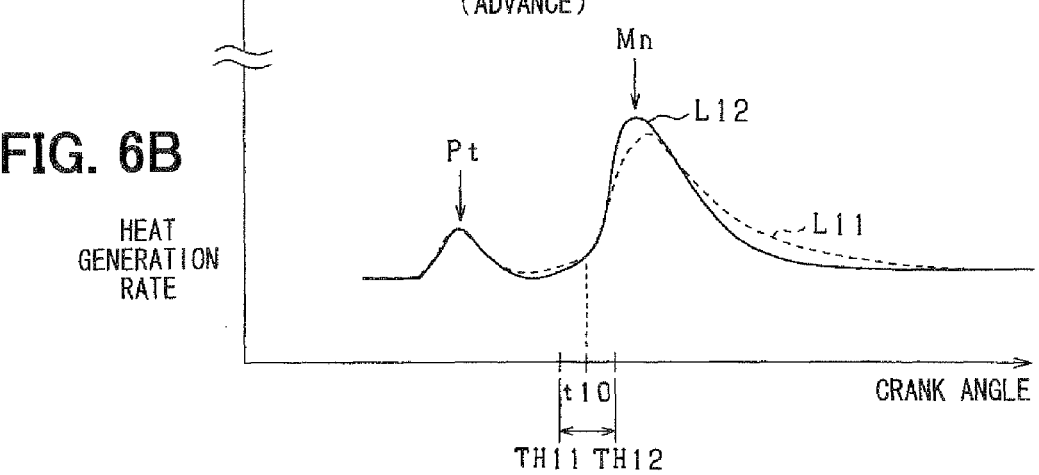

FIGS. 6A and 6B are timing charts showing an aspect of the ignition timing control according to the present embodiment. Note that FIGS. 6A and 6B correspond to FIG. 17. In this example, the ignition timing control is performed when low cetane number fuel is used, in comparison with a comparative example using high cetane number fuel.

Figure 17A:
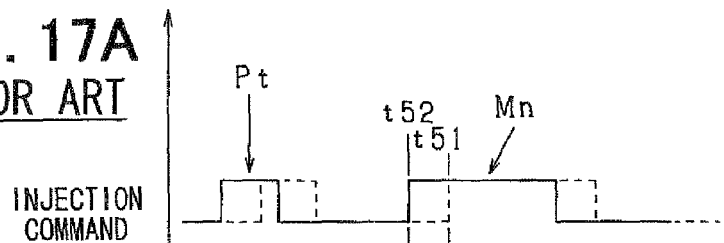
FIGS. 17A and 17B are timing charts respectively showing operational aspects of an example of conventional compression-ignition direct-injection engine combustion controller.
Figure 17B:
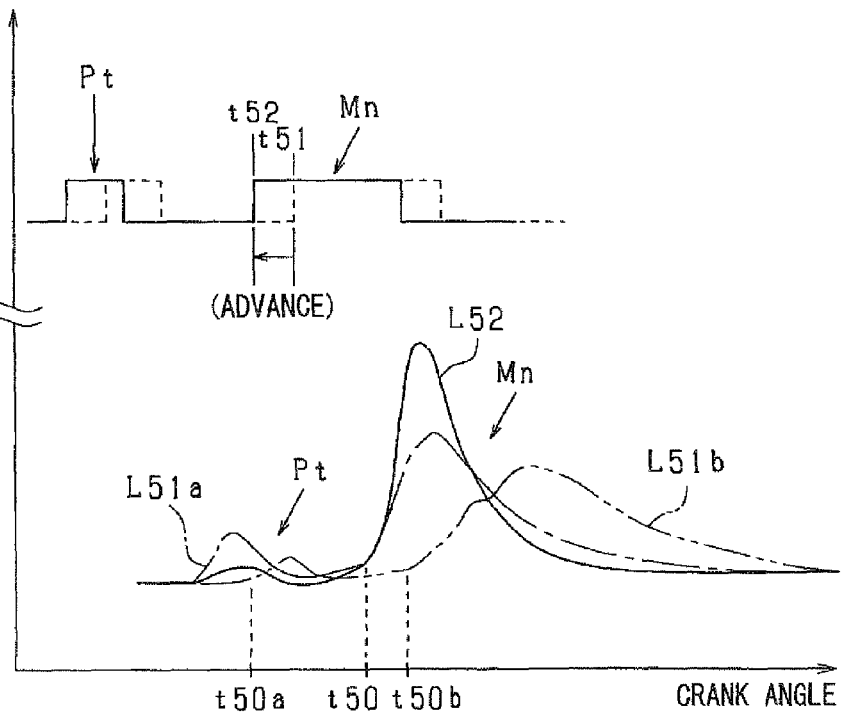

As shown in FIGS. 6A and 6B, as in the case of the apparatus shown in FIG. 17, in the present embodiment, the command value (FIG. 6A) related to execution timing of the main injection Mn (injection start timing) is corrected so as to converge the detection value of the main ignition timing (timing t10) obtained from the output from the cylinder pressure sensor 28 within a predetermined range (threshold value TH11 to threshold value TH12). Note that in the present embodiment, when it is determined that a deviation amount between the corrected command value (main injection execution timing) and a predetermined reference value (e.g., a value on the basic injection map used at Step S12 in FIG. 3) is not sufficiently small (not within the allowable range corresponding to a determination value TH13 in FIGS. 6A and 6B), the injection amount of the pilot injection Pt is corrected so as to move the main ignition timing (strictly, a detection value of the main ignition timing) to the delay side or advance side in the same direction in correspondence with whether the command value is on the delay side or advance side in the allowable range. That is, as shown in FIG. 6A, when the command value related to execution timing of the main injection Mn is advance-corrected (e.g., corrected from timing t11 to timing t12) and is on the advance side from the allowable range (corresponding to the determination value TH13), as amount-increased correction on the pilot injection Pt (change from injection time D11 to injection time D12) is performed, the main ignition timing is corrected to the advance side (in the same direction as the deviation direction of the command value), so as to return the command value related to the execution timing of the main injection Mn into the allowable range. This arrangement preferably suppresses excessive acceleration of execution timing of the main injection (injection start timing), and as shown in FIG. 6B, a waveform of heat generation rate (solid line L12 in FIG. 6B) in conformance with the waveform of the heat generation rate using the high cetane number fuel (broken line L11 in FIG. 6B) can be obtained.

In order to simplify the control, it is preferable that the correction amount of the pilot injection timing is equal to a correction amount of the main injection timing.

Figure 7:
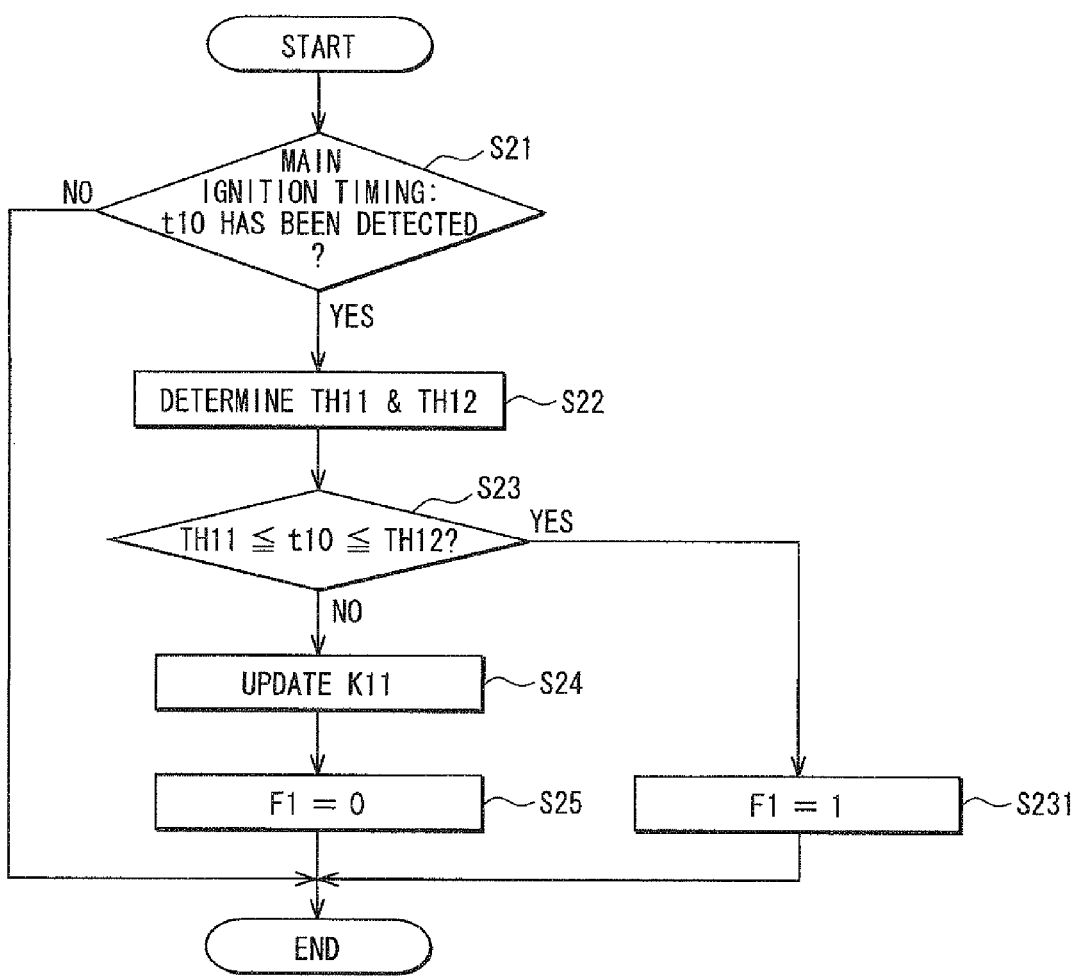
FIG. 7 is a flowchart showing a processing procedure of the ignition timing control according to the first embodiment.
Figure 8:
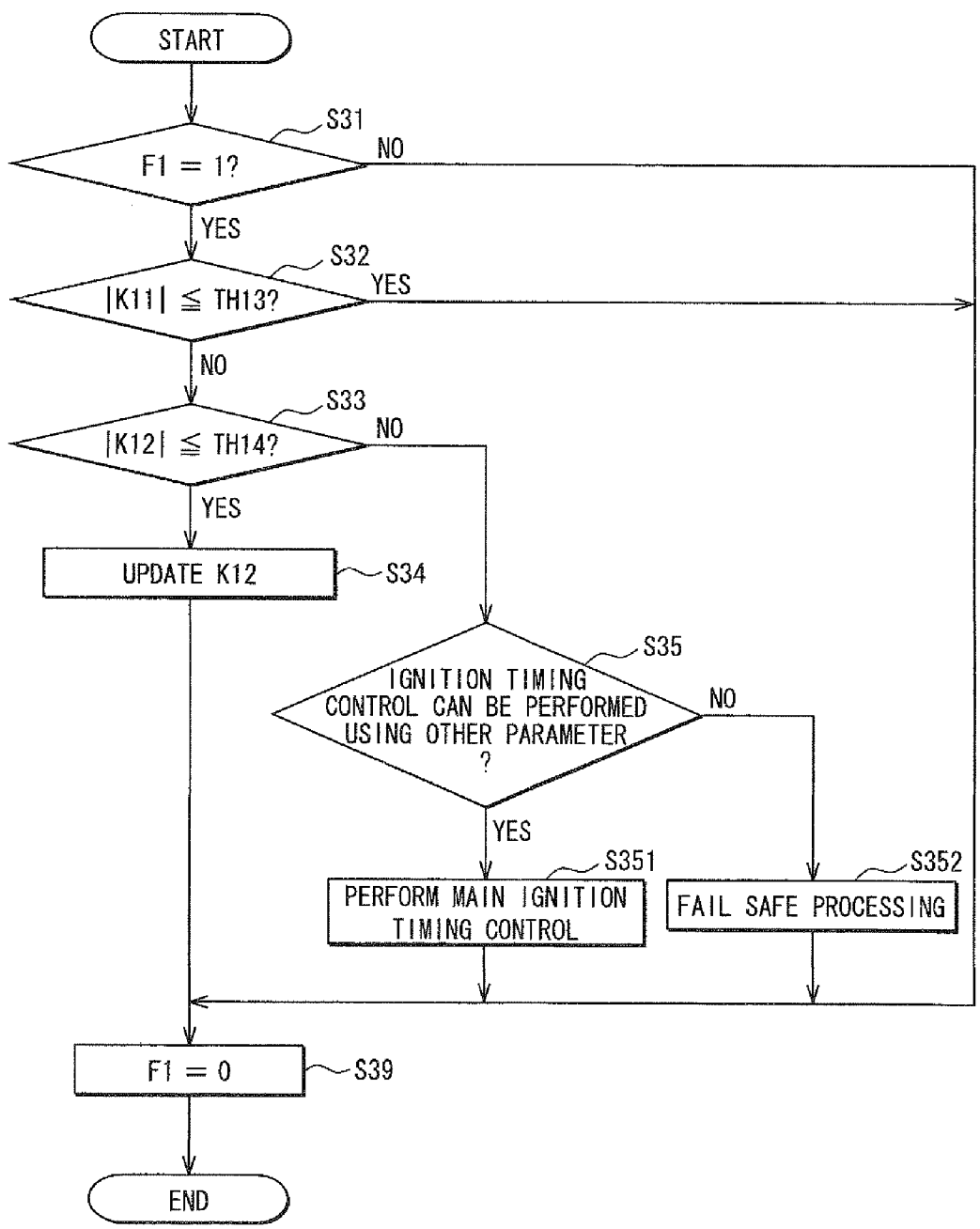
FIG. 8 is a flowchart showing another processing procedure of the ignition timing control according to the first embodiment.

Next, processing related to the above-described ignition timing control will be described with reference to FIGS. 7 and 8. FIGS. 7 and 8 are flowcharts showing processing procedures of the above processing. The processings shown in these figures are sequentially performed basically by execution of the program stored in ROM in the ECU 80 while a predetermined condition is established (e.g., always performed during engine running) at predetermined intervals (by a period the same as or earlier than an interval of the processing in FIG. 3). The values of various parameters used in the processings in FIGS. 7 and 8 are stored at any time in the storage device such as a RAM, an EEPROM or a backup RAM incorporated in the ECU 80 and updated at any time in accordance with necessity.

Figure 9:
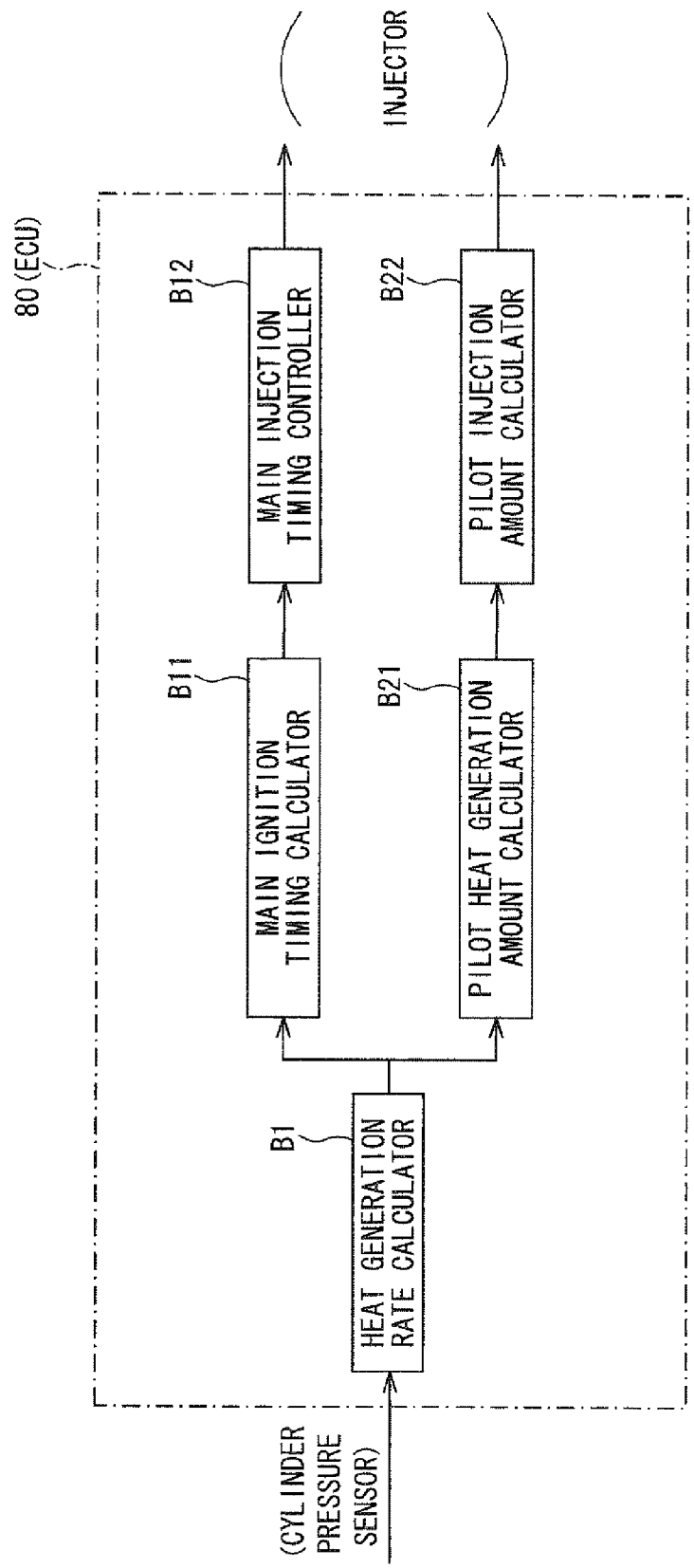
FIG. 9 is a functional block diagram showing a part of the combustion controller according to the first embodiment, particularly related to processing of an output signal from a cylinder pressure sensor.

As shown in FIG. 7, in this series of processing, at Step S21, it is determined whether or not main ignition timing (timing t10 in FIGS. 6A and 6B) has been detected. Only when it is determined at Step S21 that the main ignition timing has been detected, processing at Step S22 and the subsequent steps is performed. The main ignition timing is calculated separately (in another routine) from the processing in FIG. 7. FIG. 9 is a functional block diagram showing a part of the combustion controller (ECU 80) according to the present embodiment, particularly related to processing of the output signal from the cylinder pressure sensor 28. Next, main ignition-timing calculation processing will be described with reference to FIG. 9.

The calculation processing is briefly performed by a heat generation rate calculator B1 and a main ignition timing calculator B11 in FIG. 9. Note that the heat generation rate calculator B1 obtains an engine speed (actual measurement value by the crank angle sensor 71) and cylinder pressure (actual measurement value by the cylinder pressure sensor 28) at that time, and calculates a heat generation rate "dQ/dθ" at that time based on the following relational expression:

$$dQ/d\theta = \{k \cdot P \cdot (dV/d\theta) + V(dP/d\theta)\}/(k-1) \quad \text{(Expression 1)}$$

Note that in the Expression 1, Q means a heat generation rate; θ, a crank angle; P, pressure in the combustion chamber 16 (cylinder pressure); and k, a ratio of specific heat. In the combustion controller according to the present embodiment, an occasional heat generation rate is sequentially calculated at predetermined intervals (as the interval is shorter, the processing load is heavier, however, the detection precision of the waveform of heat generation rate is higher) by the heat generation rate calculator B1.

The main ignition timing calculator B11 in FIG. 9 receives the occasional heat generation rate sequentially calculated by the heat generation rate calculator B1, and calculates (detects) main ignition timing (timing t10) based on these heat generation rate calculation values. More specifically, in e.g., the waveform of heat generation rate (data transition), the main ignition timing is detected as timing at which the heat generation rate is suddenly changed to the positive side around the fuel injection timing of the main injection Mn. Note that the main ignition timing can be detected with high precision as timing at which the transition of heat generation rate (time change) is changed from the negative side to the positive side around the fuel injection timing of the main injection Mn.

The occasional heat generation rate sequentially calculated by the above-described heat generation rate calculator B1 is also used in a pilot heat generation amount calculator B21 in FIG. 9. That is, the pilot heat generation amount calculator B21 calculates a heat generation amount by the pilot injection Pt (total heat amount) based on the occasional heat generation rate sequentially calculated by the above-described heat generation rate calculator B1. This parameter is used in the processing in FIG. 8 (Step S34), and will be described in detail later.

When the main ignition timing t10 has been detected and it is determined at Step S21 that the main ignition timing has detected, the process proceeds to Step S22. At Step S22, the threshold values TH11 and TH12 are determined (set) based on occasional target ignition timing regarding the main injection. More specifically, a conforming value (optimum value) within the allowable range (lower and upper limit threshold values) is previously obtained by experiment or the like by unit time (e.g. by second (sec)), and stored into a predetermined storage device (e.g., an EEPROM in the ECU 80). At the above-described Step S22, the allowable range by unit time (lower and upper limit threshold values TH11 and TH12) is read from the storage device, and converted by crank angle based on the engine speed at that time, and set on the advance side and the delay side of the above-described target ignition timing.

At Step S23, it is determined whether or not the main ignition timing (timing t10) detected at Step S21 is within the allowable range (TH11 to TH12) set at the above-described Step S22 (threshold value TH11≦t10≦threshold value TH12). When it is determined at Step S23 that the main ignition timing is not within the allowable range, at the next Step S24, the command value related to execution timing of the main injection Mn (FIG. 6A) is corrected by a main injection timing controller B12 in FIG. 9 (specifically, a correction coefficient K11 is updated) to the side where the detection value of the main ignition timing (timing t10) obtained from the output from the cylinder sensor 28 is converged within the above-described allowable range (TH11 to TH12). Then, at Step S25, an ignition-timing control execution flag F1 is set to "0", and the series of processing in FIG. 7 is ended. Note that the update processing of the correction coefficient K11 (Step S24) is performed by cumulatively increasing or reducing (changing) the correction coefficient K11 by a predetermined amount (predetermined change amount). More particularly, e.g., in the initial update when it is determined at Step S23 that the main ignition timing is not within the above-described allowable range, a change amount is set based on a predetermined map (e.g. a change amount map with the engine speed and engine load as parameters). Then when it is continuously determined at Step S23 that the main ignition timing is not within the above-described allowable range, as the number of determinations (determination that the main ignition timing is not within the allowable range) at Step S23 is increased, i.e., as the number of continuous updates is increased, the change amount is reduced. For example, the change amount (update amount) of the correction coefficient K11 is sequentially reduced by setting (sequentially updating) the change amount as a value obtained by multiplying a map of the above-described map by a predetermined multiplying factor, and setting the multiplying factor as a smaller factor as the number of continuous updates is increased, such as "½", "¼", "⅛", . . . ((½)$^n$", n: number of continuous updates).

By repeatedly performing the processing in FIG. 7, the main injection is performed through Step S13 shown in FIG. 3 based on the command value set using the basic injection map and the correction coefficient (correction coefficient K11) until the main ignition timing detected at Step S21 is converged within the above-described allowable range (TH11 to TH12). The correction coefficient K11 is updated through the above-described steps S22 to S24 every time the main ignition timing is detected at Step S21. The command value of the main injection execution timing (first command value) is corrected at Step S12 in FIG. 3 using the correction coefficient K11.

Further, when it is determined at Step S23 that the main ignition timing is not within the above-described allowable range, as the processing at Step S24 is repeatedly performed, the main ignition timing is feedback controlled in the allowable range. When it is determined at Step S23 that the main ignition timing is within the allowable range, then at Step S231, the ignition-timing control execution flag F1 is set to "1", and the series of processing in FIG. 7 is ended.

In the processing in FIG. 8, first, through steps S31 to S33, it is determined whether or not the following three conditions are simultaneously satisfied.
(1) The ignition-timing control execution flag F1 is set to "1" (Step S31).
(2) The correction coefficient K11 updated at Step S24 is not within the predetermined allowable range (first allowable range) (absolute value |K11|>determination value TH13, Step S32). The determination value TH13 is set in conformance with the case of the above-described threshold values TH11 and TH12 (Step S22 in FIG. 7), or set as a predetermined fixed value.
(3) A correction coefficient K12 updated at Step S34 (described later) is within a predetermined allowable range (second allowable range) (absolute value |K12|≦determination value TH14, Step S33). The determination value TH14 is set in conformance with the case of the above-described threshold values TH11 and TH12 (Step S22 in FIG. 7), or set as a predetermined fixed value.

When it is determined that these conditions are simultaneously satisfied, as it is necessary to perform the main ignition timing control, the process proceeds to Step S34.

At Step S34, a pilot injection amount controller B22 (second correction means) in FIG. 9 corrects a command value related to the injection amount of the pilot injection Pt (second command value) (more specifically, updates the correction coefficient K12) in correspondence with whether the correction coefficient K11 is on the delay side or the advance side in the allowable range (first allowable range), i.e., in correspondence with the sign of the correction coefficient K11 ("positive: correction coefficient to the delay side" or "negative: correction coefficient to the advance side"), so as to move the detection value of the main ignition timing obtained from the output from the cylinder pressure sensor 28 (timing t10) to the delay side or the advance side in the same direction. That is, when the sign of the correction coefficient K11 is "positive (+)", the injection amount of the pilot injection Pt is amount-reduced corrected so as to move the main ignition timing to the delay side, while when the sign of the correction coefficient K11 is "negative (−)", the injection amount of the pilot injection Pt is amount-increased corrected so as to move the main ignition timing to the advance side. Then at Step S39, the ignition-timing control execution flag F1 is set to "0", and the series of the processing in FIG. 8 is ended. Note that the update of the above-described correction coefficient K12 is performed by cumulatively increasing or reducing (changing) the correction coefficient K12 by a predetermined amount (predetermined change amount). More particularly, e.g., in the initial update when it is determined at Step S33 that the correction coefficient K12 is within the above-described allowable range, the change amount at that time is set based on a predetermined map such as a change amount map with the heat generation amount by the pilot injection Pt calculated by the pilot heat generation amount calculator B21 in FIG. 9 as a parameter. Then when it is continuously determined at Step S33 that the correction coefficient K12 is within the above-described allowable range, as the number of continuous updates is increased, the change amount is reduced, in conformance with the above-described Step S24 in FIG. 7.

When it is determined at steps S31 and S32 that the conditions at the respective steps are not satisfied, as execution of the main ignition timing control is not necessary, then at Step S39, the ignition-timing control execution flag F1 is set to "0" (F1=0), and the series of processing in FIG. 8 is ended. Further, when it is determined at Step S33 that the condition at this Step S33 is not satisfied, then at Step S35, it is determined whether or not the main ignition timing control can be performed using other parameter than the main injection execution timing and the pilot ignition amount (predetermined command value for a predetermined actuator). For example, regarding one or plural predetermined parameters, allowable ranges for the respective parameters are previously set, and it is determined for each parameter that required main ignition timing control can be performed within its allowable range. As the parameter, a command value to the bypass valve 61c (FIG. 1) or the like is available, The cylinder temperature upon ignition (as the temperature is high, the main ignition timing is moved to the advance side) can be variably controlled by variably controlling (variably setting) the status of the bypass valve 61c (selection route and valve opening).

When it is determined at Step S35 that the main ignition timing control can be performed (there is a parameter to enable the main ignition timing control), then at Step S351, the main ignition timing control is performed using the parameter (when there are plural parameters, a parameter having the highest rank of previously-set priority). On the other hand, when it is determined at Step S35 that the main ignition timing control cannot be performed, then at Step S352, predetermined fail sate processing (e.g., storing a diagnostic code into an EEPROM or the like or turning on a predetermined warning lamp) is performed.

According to the processing in FIG. 8, when the correction coefficient K11 updated with the processing in FIG. 7 is not within the allowable range, as the above-described processing at Step S34 is performed, the correction coefficient K12 is updated. Accordingly, the command value related to the injection amount of the pilot injection Pt (second command value) is corrected at Step S12 in FIG. 3 with the correction coefficient K12, such that regarding the main injection Mn performed at the main injection execution timing corresponding to the correction coefficient K11, the main ignition timing is moved in the same direction as the sign of the correction coefficient K11. In this arrangement, it is determined at Step S23 in FIG. 7 that the detection value of the main ignition timing (timing t10) is within the allowable range (TH11≦t10≦TH12) with the correction coefficient K11 closer to an confirming value of the basic injection map (Step S12 in FIG. 3) (smaller absolute value |K11|). Accordingly, the correction coefficient K11 (and the main injection timing by the above-described injector 27) can be automatically converged within the allowable range by repeatedly performing the processings in FIGS. 7 and 8.

As described above, according to the compression-ignition direct-injection engine combustion controller and the engine control system according to the present embodiment, the following excellent advantages can be obtained.

(1) The compression-ignition direct-injection engine combustion controller is applied to an engine system having the compression-ignition engine 10 (internal combustion engine) to ignite and combust fuel by based on compression in the combustion chamber 16 of the cylinder 12, to generate power (torque) on the output shaft (crankshaft), and the injector 27 (fuel injection valve for cylinder injection) to directly inject-supply the fuel to the combustion chamber 16. The combustion controller controls operations of the various actuators in the system. Such compression-ignition direct-injection engine combustion controller (ECU 80 for engine control) has the program to detect main ignition timing (combustion start timing) as ignition timing of main fuel injected by a main injection Mn mainly to generate power on the output shaft (ignition timing detection means, Step S21 in FIG. 7), the program to update the correction coefficient K11 of the command value of main injection execution timing (first command value) to the above-described injector 27 (correct the first command value) in the direction to the side where the detection value of the main ignition timing (timing t10) is converged into the predetermined range (threshold values TH11 to TH12) (first correction means, Step S24 in FIG. 7), and the program to determine whether or not the correction coefficient K11 updated at Step S24 is within the predetermined range (first allowable range, —TH13 to +TH13) (and whether or not the first command value corrected with the correction coefficient K11 is within the predetermined range) (determination means, Step S32 in FIG. 8), and the program to, when it is determined at Step S32 that the correction coefficient K11 is not within the range (the first command value is not within the first allowable range), update the correction coefficient K12 of the command value related to the injection amount of the pilot injection Pt (second command value) (corrects the second command value) so as to move the detection value of the main ignition timing (timing t10) to the delay side or the advance side in the same direction in correspondence with whether the correction coefficient K11 (and the first command value) is on the delay side or the advance side (second correction means, Step S34 in FIG. 8). This apparatus, having improved robustness, can control the main ignition timing while the main injection timing by the fuel injection valve is basically around the predetermined range (first allowable range). Thus the combustion characteristic of the engine 10 (internal combustion engine), especially the combustion characteristic related to the main ignition timing of the main fuel supplied by the main injection can be improved.

(2) The program to repeatedly perform the series of processing such as processing at Step S24 in FIG. 7 (updating of the correction coefficient K11) and the processing at Step S32 (determining whether or not the correction coefficient K11 is within the predetermined range) is provided. Every time the correction coefficient K11 (and the first command value) becomes out of the allowable range (determined at Step S32), the correction coefficient K11 is returned into the allowable range, thus the main injection timing is automatically converged in the predetermined allowable range (range corresponding to the determination value TH13).

(3) At Step S34 in FIG. 8, every time it is determined at Step S32 that the correction coefficient K11 (and the first command value) is not within the allowable range, the command value related to the injection amount of the pilot injection Pt (second command value) is cumulatively changed by a predetermined change amount. The main injection timing can be accurately converged in the predetermined allowable range (range corresponding to the determination value TH13).

(4) It is advantageous that the program to determine whether or not the integrated value of the change amount accumulated at Step S34 in FIG. 8 has exceeded the allowable upper limit (cumulative determination means, Step S33 in FIG. 8) and the program to, when it is determined at Step S33 that the integrated value of the change amount has exceeded the allowable upper limit, perform one of the main ignition timing control by correction of a parameter other than the main injection execution timing and the pilot injection amount (e.g., the command value to the bypass valve 61c) and predetermined fail safe processing (steps S35, S351 and S352 in FIG. 8) are provided. In this arrangement, even inconvenience due to a shift of pilot injection amount can be more preferably prevented or suppressed. When the main ignition timing can be controlled to a proper value with the other parameter, the main ignition timing control is performed. When the main ignition timing cannot be controlled (there is no such command value), the predetermined fail safe processing is performed and the failure of ignition timing control is notified or some countermeasure is conducted.

(5) At Step S34 in FIG. 8, among the command values to the injector 27 (fuel injection valve), the command value related to an injection aspect of the pilot injection (single-step pre-sub-injection), more specifically, the command value related to the injection amount is corrected. The main ignition timing control can be more easily and more accurately performed.

(6) The allowable range (first allowable range) used at Step S32 in FIG. 8 is defined by the predetermined reference value (first reference value, a value on the basic injection map used at Step S12 in FIG. 3) and the allowable deviation amount from the first reference value (determination value TH13). At Step S32, it is determined whether the deviation amount (corresponding to the value of the correction coefficient K11) between the correction coefficient K11 (and the first command value corrected with the correction coefficient K11) and the first reference value is smaller than the allowable deviation amount. When the deviation amount is smaller than the allowable deviation amount, it is determined that the first command value is within the first allowable range (correction on the pilot injection amount is not necessary). In this arrangement, the first allowable range can be more easily and more accurately set.

(7) The initial value (fixed value in the present embodiment) of the injection control map (basic injection map) in which the command value to the injector 27 is linked with the predetermined parameters related to the engine 10 (the engine speed, the engine load and the like) is employed as the above-described first reference value. In this manner, the first reference value can be easily and appropriately set by using the injection control map stored in a ROM.

(8) At Step S21 in FIG. 7, the main ignition timing is detected based on the output from the cylinder pressure sensor 28. In this arrangement, the main ignition timing can be detected with high precision with a highly-practical structure.

(9) Further, at this time, the data transition (so-called waveform) of heat generation rate as a heat generation amount per unit time (e.g., unit time or unit number of output shaft revolutions) is obtained based on the output from the cylinder pressure sensor 28 (relational expression (1) in FIG. 9). Further, the main ignition timing is detected based on the obtained data transition (e.g., detected as timing at which the heat generation rate is suddenly changed to the positive side around the fuel injection timing of the main injection Mn). In this arrangement, the main ignition timing can be detected with high detection precision.

(10) In addition to the above respective programs, the program to perform predetermined control related to the engine 10 (torque control or the like) based on actuation of the various actuators (see FIG. 1) in the engine system (engine control means) is incorporated in the above-described ECU 80. Further, as the engine control system, in addition to the ECU 80, various sensors and actuators (see FIG. 1) are further provided. In this configuration, more reliable engine control can be performed by improvement in the combustion characteristic as described above.

It is preferable that when the command value of the main injection execution timing is changed to the advance side or the delay side (when the correction coefficient K11 is updated to the advance side or the delay side), the execution timing of the pilot injection is changed in the same direction of the delay direction and by the same amount. More particularly, as shown in FIGS. 10A and 10B, when the main injection execution timing is also advanced by x1, the pilot injection execution timing is advanced by x2 equivalent to the amount x1 (i.e. x1=x2).

According to the present embodiment a desired interval can be maintained between the pilot injection and the main injection (injection interval). Upon occurrence of pressure change in the injector 27 in accordance with execution of the pilot injection, the change of the main injection amount due to the pressure fluctuation can be suppressed. In the case of delay of the main injection timing, the same advantages can be obtained.

In this arrangement, in a case where the pilot injection and the main injection are both performed, even when the execution timing of the main injection is changed to control the ignition timing of the main injection, the main injection amount can be properly controlled, and stable fuel injection control can be realized. Further, when the execution timing of the pilot injection is changed to the advance side or the delay side by the same amount as the change amount on the advance side or the delay side in the main injection execution timing, as it is not necessary to set an interval by engine running condition, the control can be simply implemented.

In the pilot injection, a maximum advance timing (advance side guard value) is set to ensure combustionability. Accordingly, when the pilot injection timing becomes the maximum advance timing, it is desirable that the timing is not further advanced, and the pilot injection timing is limited to the maximum advance timing. That is, in such case, x1<x2 holds in FIG. 10.

<Second Embodiment>

Next, a second embodiment in which the compression-ignition direct-injection engine combustion controller and the engine control system according to the present invention are embodied will be described with reference to FIGS. 11A and 11B, and FIGS. 12 and 13. Note that the apparatus and the system according to the present embodiment basically have the same configuration according to the first embodiment as shown in FIG. 1. Accordingly, for the sake of convenience of explanation, the explanations of common constituent elements and operations will be omitted, and the difference from the above-described first embodiment will be mainly described.

Figure 11A:
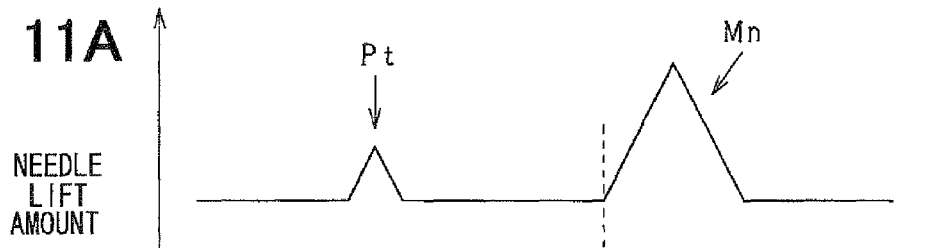
FIGS. 11A and 11B are timing charts respectively showing aspects of the ignition timing control, in the compression-ignition direct-injection engine combustion controller according to the present invention and the engine control system in which the combustion controller is incorporated according to a second embodiment of the present invention.
Figure 11B:
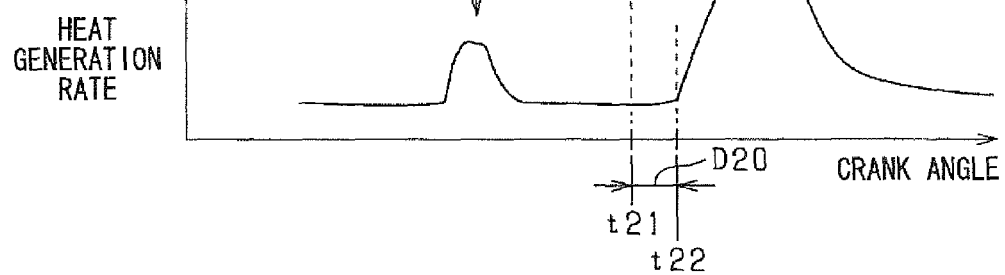
Figure 12:
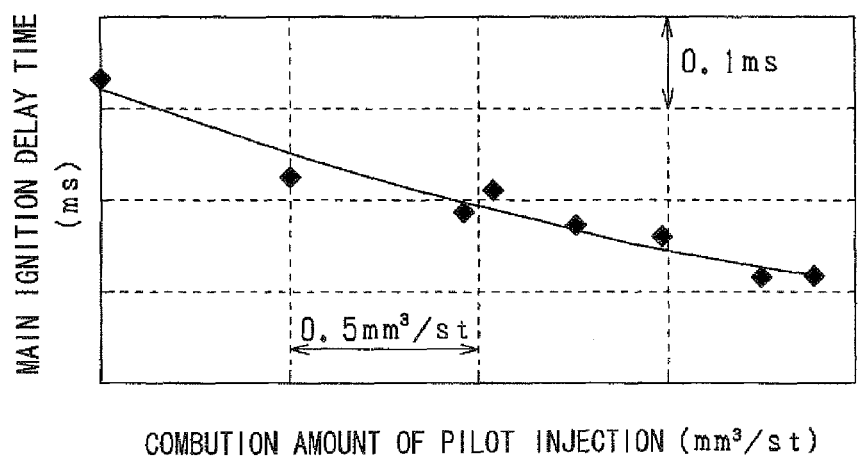
FIG. 12 is a graph showing the aspect of the ignition timing control according to the second embodiment.

As described above, when the time from the execution (start) of the main injection to the start of combustion (ignition) (main ignition delay time) is too long, sudden heat generation by combustion of a large amount of fuel at once, and inconvenience such as noise occurs. On the other hand, in a direct injection engine, as fuel is directly injected into the cylinder, when the main ignition delay time is too short, sufficient time as time for mixing intake air and fuel (preliminary mixing time) in the combustion chamber cannot be ensured, and a desired combustion characteristic cannot be obtained. In the present embodiment, as shown in FIGS. 11A and 11B, the main ignition delay time (time D20) from injection start timing of the main injection Mn (main injection execution timing, timing t21) to combustion start timing of the main injection Mn (main ignition timing, timing t22) is taken into consideration, and to avoid the above inconvenience, among the command values to the above-described injector 27, the command value related to the injection amount of the pilot injection Pt is variably set, so as to control a detection value of the time D20 to a proper value (within a predetermined allowable range). Note that as shown in the graph of FIG. 12, the main ignition delay time is shorter as the injection amount of the pilot injection Pt (the combustion amount of the pilot injection) is increased.

Figure 13:
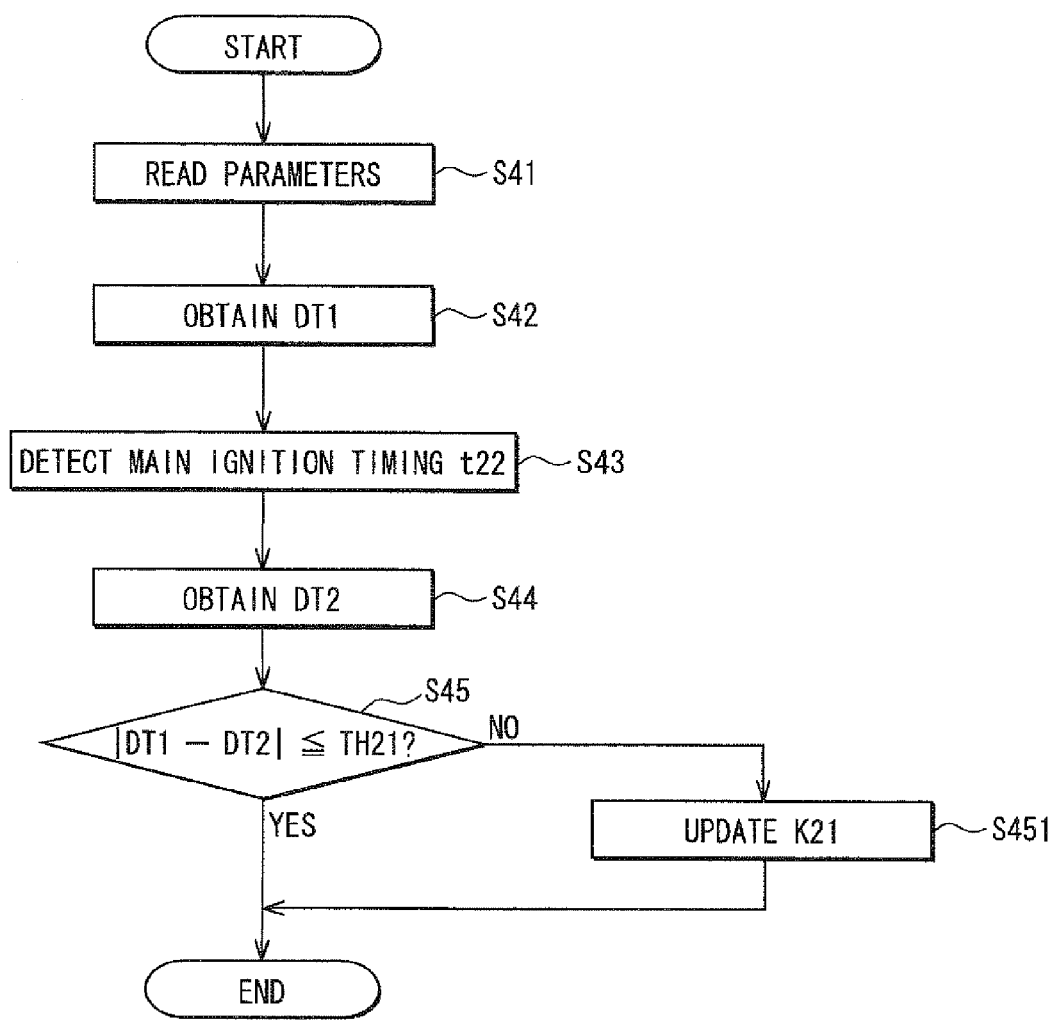
FIG. 13 is a flowchart showing a processing procedure of combustion control according to the second embodiment.

In the present embodiment, in place of the processings in FIGS. 7 and 8 in the first embodiment, processing in FIG. 13 is performed. Hereinbelow, the combustion control according to the present embodiment will be described with reference to FIG. 13. Note that the series of processing shown in FIG. 13 is also sequentially performed at predetermined processing intervals (equivalent to or shorter than the interval of the processing in FIG. 3) by execution of the program stored in a ROM in the ECU 80. The values of the various parameters used in the processing in FIG. 13 are also stored in the storage device such as a RAM, an EEPROM or a backup RAM incorporated in the ECU 80 at any time and updated at any time in accordance with necessity.

As shown in FIG. 13, upon execution of the series of processing, first at Step S41, predetermined parameters, e.g., engine speed (actual measurement value by the crank angle sensor 71) and accelerator operation amount by the driver (actual measurement value by the accelerator sensor 72) at that time, and the main injection timing (detected based on the command value to the injector 27 in consideration of the timing t21 in FIG. 11, e.g., the invalid injection period) and the like are read. Then at Step S42, a reference value DT1 of the main ignition delay time (a desired value) is obtained based on a predetermined parameter included in the various parameter read at the above-described Step S41 (further torque requirement including loss due to external load and the like is calculated in accordance with necessity). More specifically, the reference value DT1 is obtained by using a predetermined map (or an expression) stored in a ROM or the like. As this map, a map in which conforming values (optimum values) of the above-described reference value DT1 corresponding to the values of e.g. the engine speed and the accelerator operation amount (or the torque requirement calculated based on the accelerator operation amount) are previously obtained by experiment or the like and written can be used.

At Step S43, the main ignition timing (timing t22 in FIG. 11) is detected. Note that the detection (calculation) of the main ignition timing is also performed based on the configuration in FIG. 9 and the relational expression (1) while occasional cylinder pressure (actual measurement value by the cylinder pressure sensor 28) is obtained.

At Step S44, a detection value DT2 of the main ignition delay time (time D20 in FIG. 11) is calculated based on the main injection timing (timing t21) obtained at Step S41 and the main ignition timing (timing t22) calculated at Step S43. Then, at Step S45, the difference between the reference value DT1 obtained at Step S42 and the detection value DT2 (absolute value |DT1−DT2|) is compared with a predetermined determination value TH21, and it is determined whether or not the detection value DT2 is within a predetermined allowable range (|DT1−DT2|≦determination value TH21). Note that the determination value TH21 is set in conformance with the case of the threshold values TH11 and TH12 (Step S22 in FIG. 7) in the above-described first embodiment, or set as a predetermined fixed value.

When it is determined at Step S45 that the detection value DT2 is not within the allowable range, then at Step S451, the command value related to the injection amount of the pilot injection Pt (FIG. 6A) is corrected (more specifically, the correction coefficient K21 is updated) so as to bring the detection value DT2 closer to the reference value DT1. That is, when the detection value DT2 is advanced from than the reference value DT1 (positioned on the advance side), the injection amount of the pilot injection Pt is amount-reduced corrected so as to bring the both values closer to each other, while when the detection value DT2 is delayed from the reference value DT1 (positioned on the delay side), the injection amount of the pilot injection Pt is amount-increased corrected so as to bring the both values closer to each other (see FIGS. 4A to 4E). Then, the series of processing is ended with this correction coefficient updating. Note that the updating of the correction coefficient K21 is performed by cumulatively increasing or reducing (changing) the correction coefficient K1 by a predetermined amount (predetermined change amount).

When it is determined at step S45 that the detection value DT2 is within the allowable range, the correction coefficient K21 is not updated, and the series of processing in FIG. 13 is ended.

According to the processing in FIG. 13, when the detection value DT2 updated at Step S43 is not within the allowable range, the correction coefficient K21 is updated by performing the above-described processing at Step S451. As the command value related to the injection amount of the pilot injection Pt (ignition delay command value) obtained at Step S12 in FIG. 3 is corrected with the correction coefficient K21, the detection value DT2 (and the main ignition delay time) is brought closer to the reference value DT1. The detection value DT2 (and the main ignition delay time) is automatically converged in the allowable range by repeatedly performing the processing in FIG. 13.

As described above, according to the compression-ignition direct-injection engine combustion controller and the engine control system according to the present embodiment, the following excellent advantages can be obtained.

(11) The program to detect the main ignition delay time as time from injection of the main fuel by the main injection Mn to ignition of the main fuel (start of combustion) (ignition delay time detection means, steps S41, S43 and S44 in FIG. 13) and the program to variably set the command value related to the injection amount of the pilot injection Pt (ignition delay command value) based on the detection value, more specifically the correction coefficient K21 (correct the ignition delay command value) (ignition delay time control means, Step S451 in FIG. 13) are provided. At Step S451, the main ignition delay time can be controlled to a proper value, and inconvenience due to excessive ignition delay time shift (noise, shortage of preliminary mixing time or the like) can be preferably prevented or suppressed.

(12) At Step S451 in FIG. 13, among the command values to the injector 27 (fuel injection valve), the command value related to the injection aspect of the pilot injection (single-step pre-sub-injection), more specifically, the command value related to the injection amount is corrected. The main ignition delay time can be more easily and accurately controlled.

(13) As a program to detect the main ignition delay time, the program to detect the main injection start timing (injection timing detection unit, Step S41 in FIG. 13), the program to detect the main ignition timing (ignition timing detection unit, Step S43 in FIG. 13) and the program to calculate the main ignition delay time based on the respective detection values by these programs (ignition delay time calculation unit, Step S44 in FIG. 13) are provided. In this arrangement, the main ignition delay time can be more easily and accurately detected.

(14) At Step S41 in FIG. 13, the main injection start timing is detected based on the command to the injector 27. In this arrangement, the main injection start timing can be more easily and accurately detected.

(15) At Step S43 in FIG. 13, the main ignition timing is detected based on the output from the cylinder pressure sensor 28. In this arrangement, the main ignition timing can be detected with high precision with a highly-practical structure.

(16) At Step S451 in FIG. 13, the command value related to the injection amount of the pilot injection Pt (ignition delay command value) is variably set so as to bring the detection value DT2 of the main ignition delay time closer to the predetermined reference value (reference value DT1). More specifically it is determined at Step S45 in FIG. 13 whether or not the detection value DT2 is within the predetermined allowable range (defined by the reference value DT1 and the determination value TH 21). When the detection value is not within the allowable range, then at Step S451, the command value related to the pilot injection amount is corrected in the direction to the side where the detection value is converged within the allowable range. In this arrangement, even when the main ignition delay time (strictly the detection value DT2) is out of the allowable range, the main ignition delay time can be variably controlled into the predetermined allowable range by the processing at Step S451, and the inconvenience due to the above-described ignition delay time shift can be preferably prevented or suppressed.

(17) The program to repeatedly perform the series of processing in FIG. 13 while a predetermined condition is established (e.g., always during engine driving) is provided. In this arrangement, the main ignition delay time can be automatically converged into the predetermined allowable range.

(18) In addition to the above-described respective programs, the program to perform the predetermined control related to the engine 10 (torque control or the like) based on actuation of the various actuators in the engine system (see FIG. 1) (engine control means) is incorporated in the above-described ECU 80. Further, the engine control system includes various sensors and actuators (see FIG. 1) in addition to the ECU 80. In this arrangement, as the combustion characteristic is improved as described above, engine control with higher reliability can be performed.

<Third Embodiment>

Next, a third embodiment of the present invention will be described. The apparatus and the system according to the present embodiment basically have the same configuration according to the first embodiment as shown in FIG. 1. Accordingly for the sake of convenience of explanation, the explanations of common constituent elements and operations will be omitted.

In the present embodiment, ignition timing feedback control is performed so as to bring the actual ignition timing of the main injection into correspondence with target ignition timing. The injection timing of the main injection is controlled based on the deviation between the actual ignition timing of the main injection and the target ignition timing. In such ignition timing feedback control, when the ignition timing deviation of the main injection is equal to or greater than a predetermined value, or when the injection-timing feedback control amount calculated based on the ignition timing deviation is equal to or greater than a predetermined value, correction is performed regarding the injection amount of the pilot injection.

Figure 14:
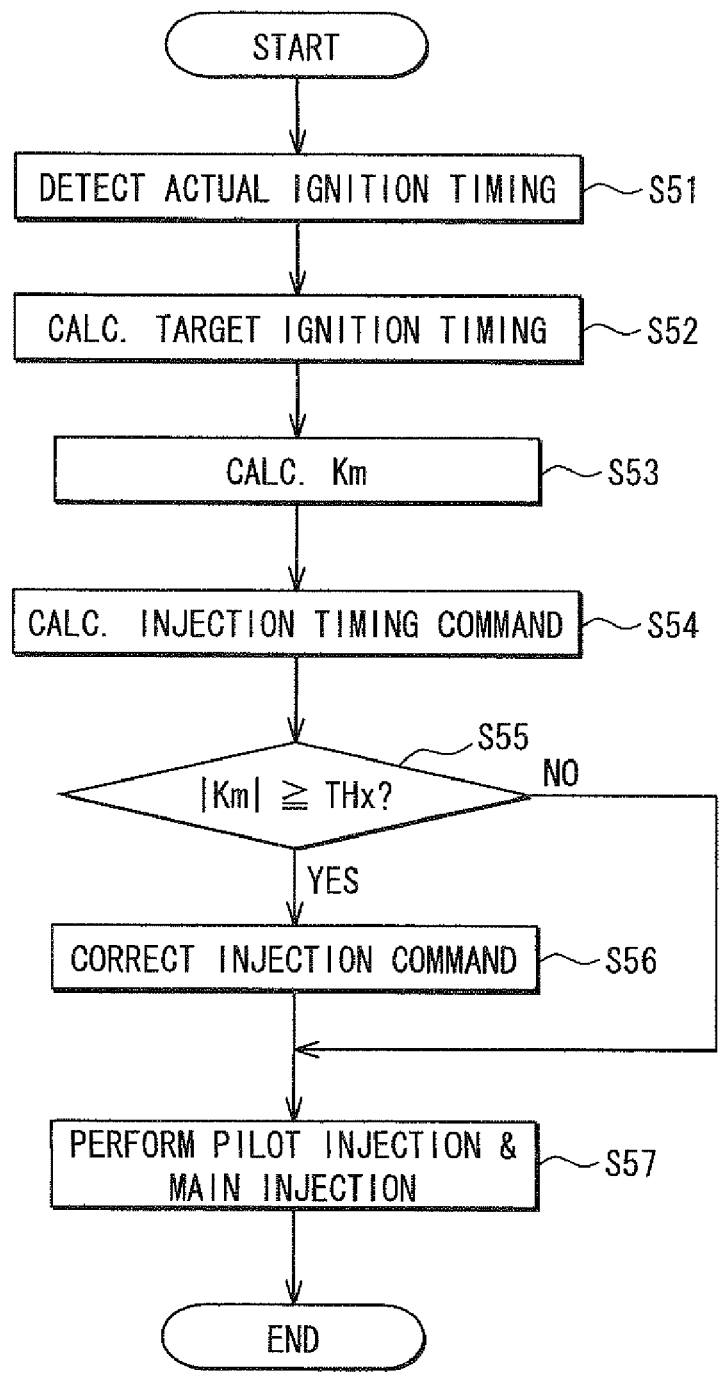
FIG. 14 is a flowchart showing a processing procedure of the fuel injection control processing according to a third embodiment of the present invention.

FIG. 14 is a flowchart showing a processing procedure of the fuel injection control processing according to the present embodiment. Basically the series of processing shown in FIG. 14 is sequentially performed at predetermined processing intervals (by a period equivalent to or shorter than the interval of the processing in FIG. 3) by execution of the program stored in a ROM in the ECPU 80. Note that although not shown, the main injection amount and the pilot injection amount are calculated based on an occasional engine running status (accelerator operation amount and/or engine speed) by other calculation processing.

In FIG. 14, at Step S51, actual ignition timing of the main injection is detected. Note that as in the case of the detection value of the main ignition timing (t10) in the first embodiment, the detection (calculation) of the actual ignition timing is performed based on the configuration in FIG. 9 and the relational expression (1) while occasional cylinder pressure (actual measurement value by the cylinder pressure sensor 28) is obtained. At Step S52, target ignition timing of the main injection is calculated. At this time, the target ignition timing of the main injection is calculated by using e.g. prepared map data and based on occasional engine speed and load requirement (e.g., an accelerator operation amount).

At Step S53, a main-injection timing correction amount Km as a feedback control amount is calculated based on the deviation between the actual ignition timing of the main injection and the target ignition timing. At Step S54, an injection timing command value of the main injection is calculated based on the main-injection timing correction amount Km. As feedback calculation, well-known PI calculation, PID calculation or the like is employed.

Regarding the main injection, when the actual ignition timing is on the delay side of the target ignition timing, a correction amount to move the main injection timing to the advance side is set as the main-injection timing correction amount Km. When the actual ignition timing is on the advance side of the target ignition timing, a correction amount to move the main injection timing to the delay side is set as the main-injection timing correction amount Km. For example, when the main-injection timing correction amount Km is to advance-correct the injection timing, a negative value is set as the Km value, while when the main-injection timing correction amount Km is to delay-correct the injection timing, a positive value is set as the Km value.

At Step S55, it is determined whether or not the absolute value of the main-injection timing correction amount Km (feedback correction amount) calculated at Step S53 is equal to or greater than a predetermined threshold value THx. At this time, the threshold value THx is set based on the target ignition timing of an occasional main injection. Note that the threshold value THx may be set as a fixed value.

When |Km|≧THx holds, the process proceeds to Step S56, at which correction of injection amount related to the pilot injection is performed based on the main-injection timing correction amount Km. At this time, an injection amount command value is calculated by increase/reduce-correcting an already-set pilot injection amount. Regarding the injection amount correction, more particularly, when the main-injection timing correction amount Km is a negative value (the actual ignition timing is delayed from the target and is to be advance-corrected), the pilot injection amount is increase-corrected. When the main-injection timing correction amount Km is a positive value (the actual ignition timing is advanced from the target and is to be delay-corrected), the pilot injection amount is reduce-corrected.

At Step S57, the main injection and the pilot injection are performed based on the command value data related to the main injection (including the above-described injection timing command value) and the command value data related to the pilot injection (including the above-described injection amount command value).

When |Km|<THx holds at Step S55, the injection amount correction of the pilot injection based on the main-injection timing correction amount Km is not performed, and the main injection and the pilot injection are respectively performed.

Note that it may be determined whether or not pilot-injection amount correction is necessary based on the ignition timing deviation (=actual ignition timing−target ignition timing) of the main injection in place of the main-injection timing correction amount Km (feedback correction amount). That is, when it is determined that the ignition timing deviation of the main injection is equal to or greater than a predetermined value, the pilot injection amount is increase-corrected or reduce-corrected. At this time, when the ignition timing deviation of the main injection corresponds to delay of the actual ignition timing from the target, the pilot injection amount is increased, while when the ignition timing deviation of the main injection corresponds to advance of the actual ignition timing from the target, the pilot injection amount is reduced.

In the above-described third embodiment, the actual ignition timing of the main injection can be advanced or delayed by amount-increased correction or amount-reduced correction on the pilot injection amount. Accordingly, even when the ignition timing deviation of the main injection or the feedback control amount of ignition timing is large, it can be reduced. In this arrangement, the combustion characteristic of the engine, especially the combustion characteristic related to the ignition timing of fuel supplied by the main injection can be improved.

As the threshold value THx for comparison of the main-injection timing correction amount Km (feedback correction amount) is set based on the target ignition timing of the main injection, even when the target ignition timing of the main injection is changed in correspondence with occasional engine running status, a proper combustion characteristic can be realized.

Figure 10:
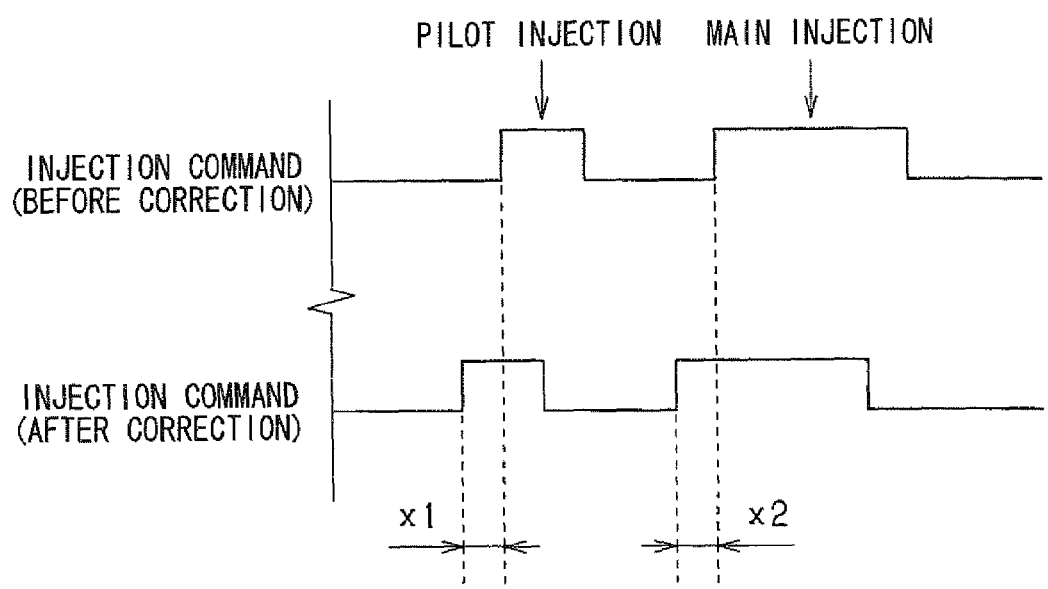
FIG. 10 is a timing chart showing injection command signals for pilot injection and main injection.

It may be arranged such that when the execution timing of the main injection is changed to the advance side or the delay side, the execution timing of the pilot injection is changed in the same direction of the advance/delay direction (see the above-described FIG. 10). In this case, the execution timing of the pilot injection is desirably changed to the advance side or the delay side by the same amount as the change amount of the execution timing of the main injection on the advance side or the delay side.

According to the present embodiment, a desired interval (injection interval) can be maintained between the pilot injection and the main injection. When pressure fluctuation occurs in the injector 27 in accordance with execution of the pilot injection, the fluctuation of the main injection amount due to the pressure fluctuation can be suppressed. The same advantage can be obtained in the case of delaying of the main injection timing.

In this arrangement, when both the pilot injection and the main injection are performed, even when the execution timing of the main injection is changed so as to control the ignition timing of the main injection, the main injection amount can be appropriately controlled, and stable fuel injection control can be realized. Further, when the execution timing of the pilot injection is changed to the advance side or the delay side by the same amount as the change amount of the main injection execution timing on the advance side or the delay side, as it is not necessary to set an interval by engine running condition, the control can be easily performed.

<Other Embodiment>

Note that the above-described respective embodiments may be modified as follows.

It may be arranged such that in the processing in FIG. 7, processing according to the processing at Step S32 in FIG. 8 is performed prior to the update processing of the correction coefficient K11 at Step S24 in FIG. 7, and when the value to be updated is not within the predetermined allowable range (first allowable range), i.e., the correction coefficient K11 will be out of the allowable range when updated, the update processing of the correction coefficient K11 at Step S24 is not performed. In this case, the program to perform the processing according to the processing at Step S32 prior to the processing at Step S24 corresponds to "allowance condition determination means".

Further, it may be arranged such that the update processing of the correction coefficient K11 is not prohibited but the update processing is limited (for example, the amount of updating is reduced) until a predetermined condition is established (for example, the value to be updated is within the first allowable range). In this case, deterioration of combustion characteristic (noise or the like) due to excessive correction can be more reliably prevented or suppressed.

Further in this case, the determination processing performed prior to the updating of the correction coefficient K11 at Step S24 in FIG. 7 is not limited to the above-described determination processing (processing according to the processing at Step S32), but processing for determining whether or not an optimum predetermined condition is established in correspondence with purpose or the like may be performed.

The processing in FIG. 8 may be omitted. It may be arranged such that in the processing in FIG. 7, prior to the processing at Step S24 in FIG. 7, it is determined whether or not the main ignition timing is within a predetermined range wider than the allowable range used at Step S23 (threshold value TH11 to threshold value TH12). When the main ignition timing is within the range, it is determined that the difference between the main ignition timing at that time and the target value is sufficiently small. Then the processing at Step S24 in FIG. 7 (first control) is performed so as to bring the main ignition timing closer to the target value. On the other hand, when the main ignition timing is not within the range, it is determined that the difference between the main ignition timing at that time and the target value is not sufficiently small. Then the processing at Step S24 in FIG. 7 is performed (note that the amount of updating of the correction coefficient K11 is limited in accordance with necessity), and the processing at Step S34 in FIG. 8 is performed (i.e., the second control is performed), so as to bring the main ignition timing closer to the target value. In this case, a program to perform the series of processing related to the above-described control corresponds to "control means" In this arrangement, deterioration of combustion characteristic due to excessive control shift (noise or the like) can be preferably prevented or suppressed.

The updating aspect of the correction coefficients K11, K12 and K21 is not limited to the above-described aspect but the correction coefficients may be arbitrarily updated. For example, to simplify the program, the correction coefficients may be cumulatively changed by a fixed change amount.

In the above-described respective embodiments, the cylinder pressure sensor is provided in the respective cylinders. However, it may be arranged such that the sensor is provided in a part (e.g., one) of the cylinders, and regarding the other cylinders, an estimation value based on an output from the sensor is used. Note that it is preferable that in the case where the above-described cylinder pressure sensor is provided in a part of the cylinders, the cylinder pressure of another cylinder is estimated by using an actual measurement value of the cylinder pressure obtained in the cylinder provided with the cylinder pressure sensor. In this arrangement, cylinder pressures of many cylinders can be measured while the number of sensors and calculation load are suppressed as much as possible.

Figure 15:
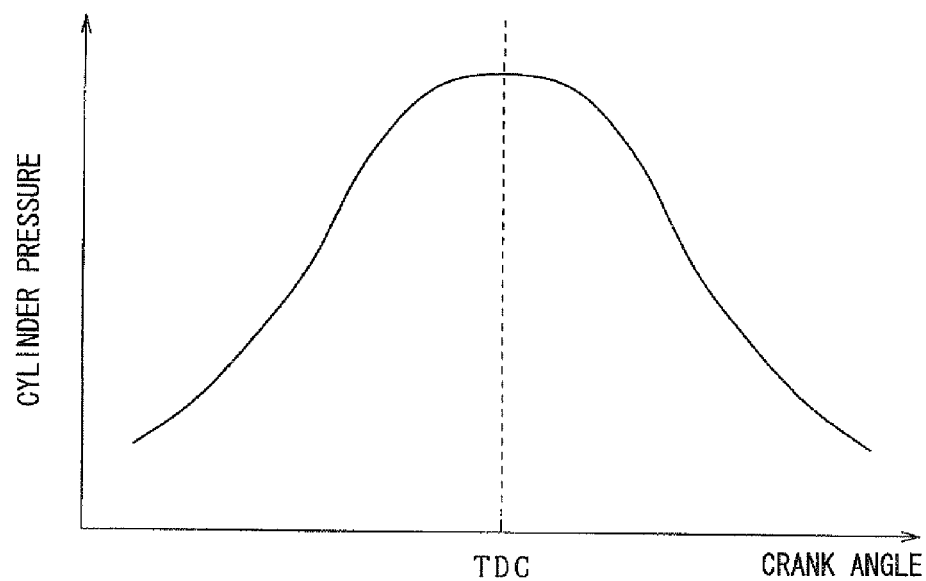
FIG. 15 is a graph showing a modification of the respective embodiments.

Further, it may be arranged such that the cylinder pressure sensor is not provided at all but the cylinder pressure is estimated from another parameter. For example, the pressure in the cylinder 12 (cylinder pressure) is generally changed in one combustion cycle as shown in FIG. 15. That is, the cylinder pressure is the highest in the vicinity of the TDC (Top Dead Center), and at least around the TDC, becomes lower as away from the pressure peak (maximum point). With such crank angle, a map showing relation between cylinder pressure and corresponding status defined by the value of another parameter influencing the cylinder pressure (especially a parameter having large influence is arbitrarily selected) may be made. The cylinder pressure can be estimated based on each parameter value in the map. Note that as the cylinder pressure is increased, the combustion rate (corresponding to combustibleness) as the amount of heat per unit fuel amount generated by combustion of the fuel is increased.

In the above-described first embodiment, to set the allowable range to a more appropriate range, the threshold values TH11 and TH12 are prepared in time units in the storage device, and at Step S22, converted in crank angle units. However, the threshold values TH11 and TH12 may be prepared in crank angle units from the start. This can omit the conversion to crank angle units.

Figure 16:
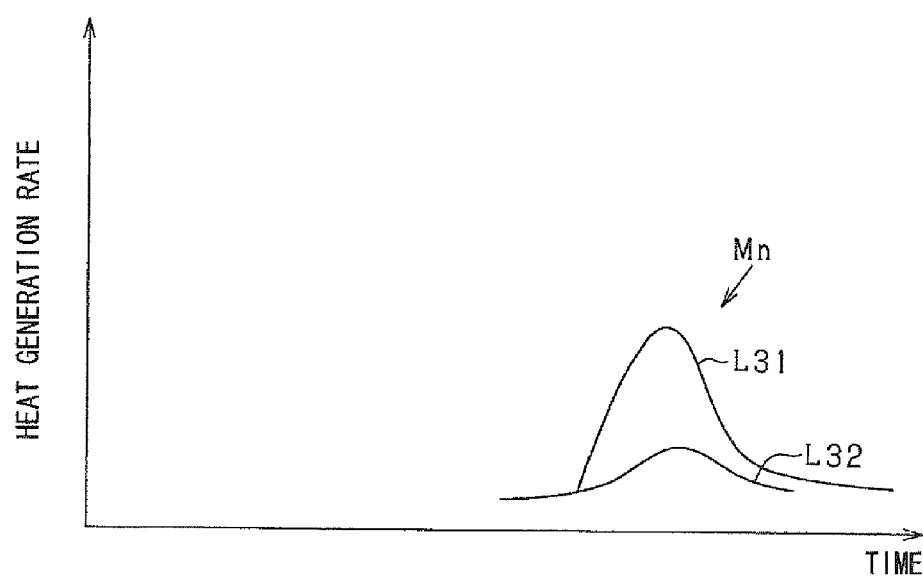
FIG. 16 is a graph showing another modification of the respective embodiments.

As shown in FIG. 16, the data transition (so-called waveform) of heat generation rate is changed in correspondence with engine load (e.g., detected as a torque requirement as a base of determination of the command values to the various actuators upon torque control). That is, under high load, as indicated with a solid line L31 in FIG. 16, a sudden change of heat generation rate (change to the increment side) occurs at the main ignition timing, while under low load, the change is loosened. Under low load, it is difficult to detect the main ignition timing with high precision. Accordingly, it is available that the above-described threshold values TH11 and TH12 are variably set based on engine load at that time so as to e.g. widen the allowable range as the engine load is low. Note that the same arrangement is available in the case of the allowable range related to the main ignition delay time according to the second embodiment.

In the above-described respective embodiments, when it is determined that normal control should not be performed, the main ignition timing and the main ignition delay time are variably controlled by correcting (changing) the command value related to the pilot injection amount, among the command values to the injector 27, as the next control. However, the main ignition timing and the main ignition delay time may be variably controlled with another parameter. For example, in the same injection aspect of the pre-sub-injection, a parameter other than the injection amount, i.e., a command value related to the number of injection steps (including pre injection or the like in addition to the pilot injection), injection timing or injection interval may be corrected (changed).

The command value to other actuator than the injector 27 may be used as the second command value and the ignition delay command value to variably set the main ignition timing and the main ignition delay time. Basically, an arbitrary command value can be adopted as the second command value and the ignition delay command value as long as it is related to combustion rate upon main injection (ignitionability of fuel in the combustion chamber 16).

For example, a command value to act on the cylinder temperature upon ignition or a command value to act on the cylinder pressure upon ignition may be used. When the intake temperature is variably controlled, it is available to adopt a command value to variably set the status of the bypass valve 61c (selection route or valve opening) as described above. Further, when the configuration of a system to which the present invention is applied is changed and a similar valve exists in the system, a command value to variably set the status of the valve may be used. For example, the EGR piping 61 (connecting the intake and exhaust passages) may be replaced with a branching passage formed in the intake and exhaust passages. Further, a bypass passage (relief passage) may be provided to the inter-cooler 33 (corresponding to a cooling device as in the case of the EGR cooler 63). Further, the number of branching passages is not limited to two, but three or more branching passages may be formed. Further, it may be arranged such that heat radiation amounts from these branching passages are different in accordance with other condition than existence/absence of cooling device (e.g., type of piping). Further, when the distribution area (degree of closing) of the branching passage is variable, the selection between closing and opening may be performed in a binary manner. Otherwise, a technique for reflowing exhaust to the upstream of the intake side compressor to introduce low-temperature inactive gas (low pressure EGR) may be applied. Further, the intake temperature can be variably controlled by other method than that using the bypass passage. For example, the intake temperature may be variably controlled by using a sub radiator, an appropriate heater (e.g. a nichrome wire) or the like. Further, the intake temperature may be indirectly controlled by variably controlling the temperature of EGR gas or the EGR rate without directly controlling the intake temperature. Note that in this case, the temperature of EGR gas may be variably controlled by using a sub radiator, an appropriate heater or the like.

As a parameter related to the cylinder pressure upon ignition, in a recently-developed engine having a variable compression ratio mechanism using an eccentric crankshaft or the like, a command value related to a driving amount of the mechanism or the like may be used. Further, a command value to act on a parameter related to the intake charging efficiency to a subject cylinder (e.g., the amount of new air) or the like is available. Further, a command value to act on the pressure of intake air to the subject cylinder (intake pressure) is especially available. Note that upon variable control of intake pressure, it is available to use a command value to variably set the supercharging amount of intake air to the subject cylinder through a supercharger or the like to variably set the supercharging amount. As a device to variable set the supercharging amount (supercharger), a turbo charger with variable geometrical mechanism, in which a variable nozzle mechanism or the like to variably change supercharging pressure (strictly, the amount of supercharging with turbine rotation) with a geometrical mechanism is attached to a turbo charger, a turbo charger with an electric assist motor, a turbo charger having an auxiliary compressor on the upstream side or downstream side of the compressor; or the like is availably used.

Further, it is available to use a command value related to the amount of driving of an ignition auxiliary device such as a glow plug. The glow plug is an electric heater which heats a heating element provided in a predetermined position in the cylinder to locally increase the temperature of the atmosphere in the cylinder to a high temperature. The glow plug is generally used in a diesel engine or the like to assist ignition upon starting. Accordingly, such device has high practicability. Further, in recent years, an ignition auxiliary device to assist ignition by locally changing the atmosphere in the cylinder to the energy increasing side by electromagnetic action with laser or the like is studied. Such ignition auxiliary device may be employed.

Further, it may be arranged such that the combustion rate is controlled to a desired value by variably controlling the valve opening of a swirl control valve or the amount of discharge from the fuel pump 43, or valve timing or valve lift amount of a variable valve device.

Further, it may be arranged such that an appropriate combination of the above-described various command values, including the above-described command value related to the injection aspect of the pre-sub-injection, is used as the second command value and the ignition delay command value to variably control the main ignition timing and the main ignition delay time. In this case, it is available to previously prepare plural types of command values as a command value related to the combustion rate. That is, it is available that at Step S34 in FIG. 8, Step S451 in FIG. 13 or Step S351 in FIG. 8, a part (one or plural) of the plural types of command values is selected based on the engine running condition at that time, and the above-described correction is performed on the selected one or plural command values.

In the above-described respective embodiments, the main ignition timing is detected based on the cylinder pressure. However, the heat generation rate, and the main ignition timing may be detected based on an output from a sensor to measure cylinder temperature or cylinder gas composition provided in the cylinder. Further, the heat generation rate; and the main ignition timing may be detected (estimated using a map) based on at least one of predetermined intake parameters (e.g., intake temperature, intake pressure, intake component information and the like) and exhaust parameters (e.g., exhaust temperature, exhaust pressure, exhaust component information and the like).

In the second embodiment, at Step S41 in FIG. 13, the main injection start timing is detected based on the command value to the injector 27. However, the detection aspect of the main injection start timing is not limited to this arrangement but the main injection start timing may be arbitrarily detected. For example, the engine running status (corresponding value of the command value) referred to upon determination of the command value may be used in place of the above-described command value. Further, the detection may be performed based on a parameter indicating the operation status of the fuel injection valve (injector 27). For example, it may be arranged such that the fuel injection valve (injector 27) is provided with a sensor to measure a lift amount of the needle 27b (FIG. 2), and the main injection start timing is detected based on an output from the sensor. Otherwise, the main injection start timing may be detected based on the degree of fluctuation of rail pressure in accordance with fuel injection. Further, to increase the detection precision, it may be arranged such that the injector 27 itself (or around the injector) is provided with a fuel pressure sensor and the main injection start timing is detected based on the degree of fluctuation of fuel pressure in accordance with fuel injection by the injector 27.

In the second embodiment, the main ignition delay time is detected based on the main injection start timing and the main ignition timing. However, the detection of the main ignition delay time is not limited to this arrangement but the main ignition delay time may be directly detected (e.g., estimated using a map) based on e.g. a predetermined intake parameter (intake temperature, intake pressure, intake component information or the like).

Note that although the above-described respective sensors (the sensor for detection of cylinder temperature, the sensor for detection of cylinder gas composition, the sensor for detection of needle lift amount, the fuel pressure sensor around the injector and the like) are not practically used (some of these sensors has been used in testing or the like) since sufficient sensor life or the like cannot be obtained at present, however, there is a probability that these sensors will be put into practical use (mounted on a commercial vehicle) in the future.

In the above-described respective embodiments and modifications, the respective timings and times as detection subjects (the main injection start timing, the main ignition timing, the main ignition delay time and the like) may be substituted with parameters correlated with the timings and times. More particularly, the timings and times may be substituted with timing indicating e.g. predetermined points in the waveform of heat generation rate (particularly predetermined points in main combustion), i.e., maximum and minimum points (timing at which the change direction of data value is changed from positive/negative to negative/positive), timing at which the data value becomes a maximum/minimum value in a predetermined period, timing at which the data value is suddenly changed to the positive/negative side (or stabilized), timing at which the data value is beyond (or below) a predetermined threshold value (e.g., a zero crossing point) and the like.

In the above-described embodiments, the main injection and the pilot injection by an injection amount smaller than that of the main injection are performed as a plural times of fuel injections (multistep injection) performed in one combustion cycle of the engine. However, it may be arranged such that a fuel injection is performed plural times by the same fuel amount in one combustion cycle. In this arrangement, among the plural fuel injections, regarding a particular injection as a second or subsequent fuel injection, ignition timing feedback control is performed so as to converge the fuel ignition timing to a target. Then it is determined whether or not the ignition timing deviation between actual ignition timing and its target of the particular injection (or ignition-timing feedback control amount calculated based on the deviation) is equal to or greater than a predetermined value. When it is determined that the ignition timing deviation or the ignition-timing feedback control amount is equal to or greater than the predetermined value, the injection amount may be changed regarding an injection immediately before the particular injection. The details of the control is as descried in the third embodiment.

The system configuration shown in FIG. 1 is merely an example of applicable configuration of the present invention. Even when the configuration in FIG. 1 is appropriately changed, basically the present invention can be applied as in the case of the above-described respective embodiments as long as it is a control system for a compression-ignition direct-injection engine (including a mixture compression ignition PCCI engine, an HCCI engine or the like). For example, in the above-described respective embodiments, the injector 27 having the structure as shown in FIG. 2 is employed, however, an arbitrary structure may be selected as the structure of the fuel injection valve in correspondence with purpose or the like. That is, the fuel injection valve is not limited to the electromagnet fuel injection valve using an electromagnetic solenoid as an actuator. For example, a piezo injector using a piezo-electric device as a needle actuator may be employed. Further, the fuel injection valve is not limited to the hydraulic fuel injection valve controlled with a pulse signal in a binary manner. For example, a direct-acting fuel injection valve (e.g., recently-developed direct-acting piezo injector) to continuously and directly variably control the needle lift amount, and injection rate, in correspondence with drive-current supply amount may be employed. Further, a fuel injection valve to open/close its injection orifice with the needle or an out-opening valve type fuel injection valve may be employed. When such change is made in the above-described respective embodiments, it is desirable that the details of the above-described various processings (programs) also arbitrarily changed (design-changed) in correspondence with actual structure.

In the above-described embodiments and modifications have been described on the premise of use of various software programs. However, the same functions may be realized with hardware such as specialized circuits.

What is claimed is:

1. A combustion controller for an engine system having a compression ignition engine that ignites and combusts fuel based on compression in a combustion chamber in a cylinder to generate power to an output shaft, and a fuel injector for directly injecting the fuel to the combustion chamber, the combustion controller controlling an operation of at least one actuator in the system, comprising:

an ignition timing detection unit for detecting main ignition timing as ignition timing of main fuel injected by a main injection mainly for generation of power to the output shaft or a parameter correlated with the main ignition timing;

a first correction unit for correcting a first command value as a command value of main injection execution timing to the fuel injector in a direction to the side where a detection value by the ignition timing detection unit is converged within a predetermined range;

a determination unit for determining whether the first command value corrected by the first correction unit is within a first allowable range;

a second correction unit for, when the determination unit determines that the first command value is not within the first allowable range, correcting a second command value other than the first command value among command values to actuators in the system, so as to move the detection value by the ignition timing detection unit to a delay side or advance side in a same direction, in correspondence with whether the first command value is on the delay side or the advance side, wherein the second command value is a command value which relates to an injection other than the main injection.

2. The combustion controller according to claim 1, further comprises a unit for repeatedly performing correction processing by the first correction unit, determination processing by the determination unit and correction processing by the second correction unit while a predetermined condition is established.

3. The combustion controller according to claim 2, wherein the second correction unit cumulatively changes the second command value by a predetermined change amount every time when the determination unit determines that the first command value is not within the first allowable range.

4. The combustion controller according to claim 3, further comprising:

a cumulative determination unit for determining whether an integrated value of the change amount cumulated by the second correction unit has exceeded an allowable upper limit; and a unit for, when the cumulative determination unit determines that the integrated value of the change amount has exceeded the allowable upper limit, performing main ignition timing control by correction on a predetermined command value other than the first command value and the second command value among the command values to the actuators in the system, or predetermined fail safe processing.

5. The combustion controller according to claim 1, further comprising a pre-sub-injection execution unit for performing pre-sub-injection to inject the fuel prior to execution of the main injection in one combustion cycle of the engine.

6. The combustion controller according to claim 5, wherein the second command value is a command value related to the pre-sub-injection performed by the pre-sub-injection execution unit.

7. The combustion controller according to claim 6, wherein the second command value is a command value related to an injection amount of a single-step pre-sub-injection performed by the pre-sub-injection execution unit.

8. The combustion controller according to claim 5, further comprising a unit for, when the first correction unit corrects the main injection execution timing to the advance side or the delay side, changing execution timing of the pre-sub-injection in the same direction as an advance or delay direction.

9. The combustion controller according to claim 1, wherein the second command value is a parameter which acts on ignitionability of the fuel in the combustion chamber.

10. The combustion controller according to claim 1, wherein the first allowable range used by the determination unit is a range defined by a predetermined first reference value and an allowable deviation amount from the first reference value, and wherein the determination unit determines whether a deviation amount between the first command value corrected by the first correction unit and the first reference value is smaller than the allowable deviation amount, and when the deviation amount is smaller than the allowable deviation amount, determines that the first command value is within the first allowable range.

11. The combustion controller according to claim 10, wherein the first reference value used by the determination unit is an initial value of an injection control map in which the command value to the fuel injector is linked to a predetermined parameter related to the engine.

12. The combustion controller according to claim 1, wherein the cylinder is provided with a cylinder pressure sensor that outputs a detection signal corresponding to pressure of the combustion chamber, and wherein the ignition timing detection unit detects the main ignition timing or a parameter correlated with the main ignition timing based on the detection signal outputted from the cylinder pressure sensor.

13. The combustion controller according to claim 12, wherein the ignition timing detection unit obtains data transition of heat generation rate as a heat generation amount per predetermined time based on the detection signal outputted from the cylinder pressure sensor, and detects the main ignition timing or the parameter correlated with the main ignition timing based on the obtained data transition.

14. An engine control system comprising:

the combustion controller according to claim 1, an actuator in the engine system as a control subject of the combustion controller, and an engine control unit for performing predetermined control for the engine based on actuation of the actuator.

15. The combustion controller according to claim 1, wherein a correction amount by the first correction unit is equal to a correction amount by the second correction unit.

16. A method of controlling combustion of an engine system having a compression ignition engine that ignites and combusts fuel based on compression in a combustion chamber in a cylinder to generate power to an output shaft, and a fuel injector for directly injecting the fuel to the combustion chamber, the method including controlling an operation of at least one actuator in the system and comprising:

detecting main ignition timing as ignition timing of main fuel injected by a main injection mainly for generation of power to the output shaft or a parameter correlated with the main ignition timing;

correcting a first command value as a command value of main injection execution timing to the fuel injector in a direction to the side where a detection value detected by said detecting is converged within a predetermined range;

determining whether the corrected first command value is within a first allowable range;

when the determining includes determining that the first command value is not within the first allowable range, correcting a second command value other than the first command value among command values to actuators in the system, so as to move the detection value detected by said detecting to a delay side or advance side in a same direction, in correspondence with whether the first command value is on the delay side or the advance side, wherein the second command value is a command value which relates to an injection other than the main injection.

17. The method of claim 16, wherein the second command value is a command value related to a pre-sub-injection performed to inject the fuel prior to execution of the main injection in one combustion cycle of the engine.

* * * * *